United States Patent
Jocoy et al.

(10) Patent No.: US 6,624,782 B2
(45) Date of Patent: Sep. 23, 2003

(54) SYSTEM AND METHOD FOR AVOIDING ACCIDENTS IN INTERSECTIONS

(75) Inventors: Edward H. Jocoy, Williamsville, NY (US); James R. Knight, Columbia, MD (US); Thomas F. Leney, Elma, NY (US); Herbert A. Pirson, Amherst, NY (US); John A. Pierowicz, Lancaster, NY (US)

(73) Assignee: Veridian Engineering, Inc., Arlington, VA (US)

( * ) Notice: Subject to any disclaimer, the term of this patent is extended or adjusted under 35 U.S.C. 154(b) by 0 days.

(21) Appl. No.: 09/794,166

(22) Filed: Feb. 28, 2001

(65) Prior Publication Data

US 2002/0036584 A1 Mar. 28, 2002

Related U.S. Application Data

(60) Provisional application No. 60/185,748, filed on Feb. 28, 2000.

(51) Int. Cl.[7] ............................................... G01S 13/93
(52) U.S. Cl. ............................ 342/70; 342/27; 342/28; 342/71; 342/72; 342/195; 342/357.06; 342/357.08; 701/300; 701/301
(58) Field of Search ............................. 342/27, 28, 70, 342/71, 72, 175, 195, 357.01–357.07; 340/431–437; 701/200, 201, 202, 207, 208–217, 223, 300, 301, 302

(56) References Cited

U.S. PATENT DOCUMENTS

| | | | |
|---|---|---|---|
| 3,337,866 A | * | 8/1967 | Gisonno ..................... 342/71 |
| 5,381,338 A | | 1/1995 | Wysocki et al. |
| 5,467,072 A | | 11/1995 | Michael |
| 5,471,214 A | | 11/1995 | Faibish et al. |
| 5,521,579 A | | 5/1996 | Bernhard |
| 5,546,311 A | | 8/1996 | Sekine |
| 5,612,699 A | | 3/1997 | Yamada |
| 5,646,612 A | | 7/1997 | Byon |
| 5,699,986 A | | 12/1997 | Welk |
| 5,714,947 A | | 2/1998 | Richardson et al. |
| 5,751,211 A | * | 5/1998 | Shirai et al. ................. 340/435 |
| 5,761,630 A | | 6/1998 | Sekine et al. |
| 5,786,787 A | | 7/1998 | Eriksson et al. |
| 5,798,727 A | * | 8/1998 | Shirai et al. .................. 342/70 |
| 5,806,019 A | * | 9/1998 | Ishiyama ..................... 701/300 |
| 5,907,293 A | | 5/1999 | Tognazzini |
| 5,926,114 A | | 7/1999 | Andrews |
| 5,939,976 A | * | 8/1999 | Sasaki et al. ................ 340/435 |
| 5,940,010 A | | 8/1999 | Sasaki et al. |
| 5,978,737 A | | 11/1999 | Pawlowski et al. |
| 5,983,161 A | | 11/1999 | Lemelson et al. |
| 5,991,460 A | | 11/1999 | Mitchell |
| 6,275,180 B1 | * | 8/2001 | Dean et al. ..................... 342/70 |

FOREIGN PATENT DOCUMENTS

| | | |
|---|---|---|
| EP | 0464821 A1 | 1/1992 |
| EP | 0540226 A2 | 5/1993 |
| FR | 2562694 A1 | 10/1985 |
| JP | 10281787 A1 | 10/1998 |
| WO | 95/31798 A1 | 11/1995 |
| WO | 9964822 A1 | 12/1999 |

OTHER PUBLICATIONS

"Radar Sensors for Intersection Collision Avoidance," Jocoy et al., Buffalo, New York, 11 pages, SPIE 11/96.

"Threat Detection System for Intersection Collision Avoidance," Jocoy et al., Buffalo, New York, 12 pages, SPIE 10/97.

"Threat Detection System for Intersection Collision Avoidance," Jocoy et al., SAE, Detroit, Michigan, title pages and pages 1–13, 2/98.

(List continued on next page.)

Primary Examiner—Bernarr E. Gregory
(74) Attorney, Agent, or Firm—Steptoe & Johnson LLP

(57) ABSTRACT

A method for a subject vehicle to avoid collisions is provided. At least one lane feeding into an intersection is scanned. The presence of a threat vehicle in the at least one lane is detected. Whether the subject vehicle and the threat vehicle will occupy the intersection at the same time is predicted. A warning is issued in response to the predicting.

24 Claims, 19 Drawing Sheets

OTHER PUBLICATIONS

"Development of An Algorithm for Intersection Collision Avoidance," Pierowicz et al., ITS America, 32 pages, 5/98.

"Adapting Radar and Tracking Technology to an On-Board Automotive Collision Warning System," Jocoy et al., DASC, Buffalo, New York, 8 pages, 11/98.

"Threat Detection System for Intersection Collision Avoidance–Real–Time System Performance," Jocoy et al., SAE, Detroit, Michigan, title pages and pages 87–97, 3/99.

"Integration of Radar and GPS/GIS for Intersection Threat Detection and Collision Avoidance," Jocoy et al., World Congress, Buffalo, New York, pp. 1–8, 11/99.

"Intersection Collision Avoidance Using ITS Coutermeasures, Task 9: Final Report," Buffalo, New York, 9/99.

International Search Report for Application Number PCT/US01/06252.

* cited by examiner

OCCURES AT INTERSECTIONS
WITH EITHER PHASED SIGNAL
OR STOP SIGNS

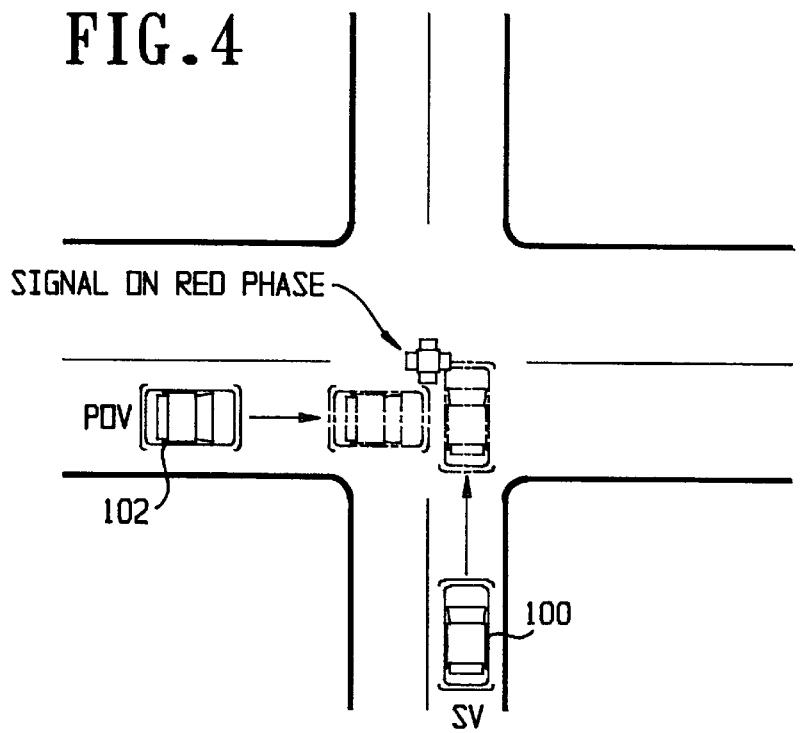
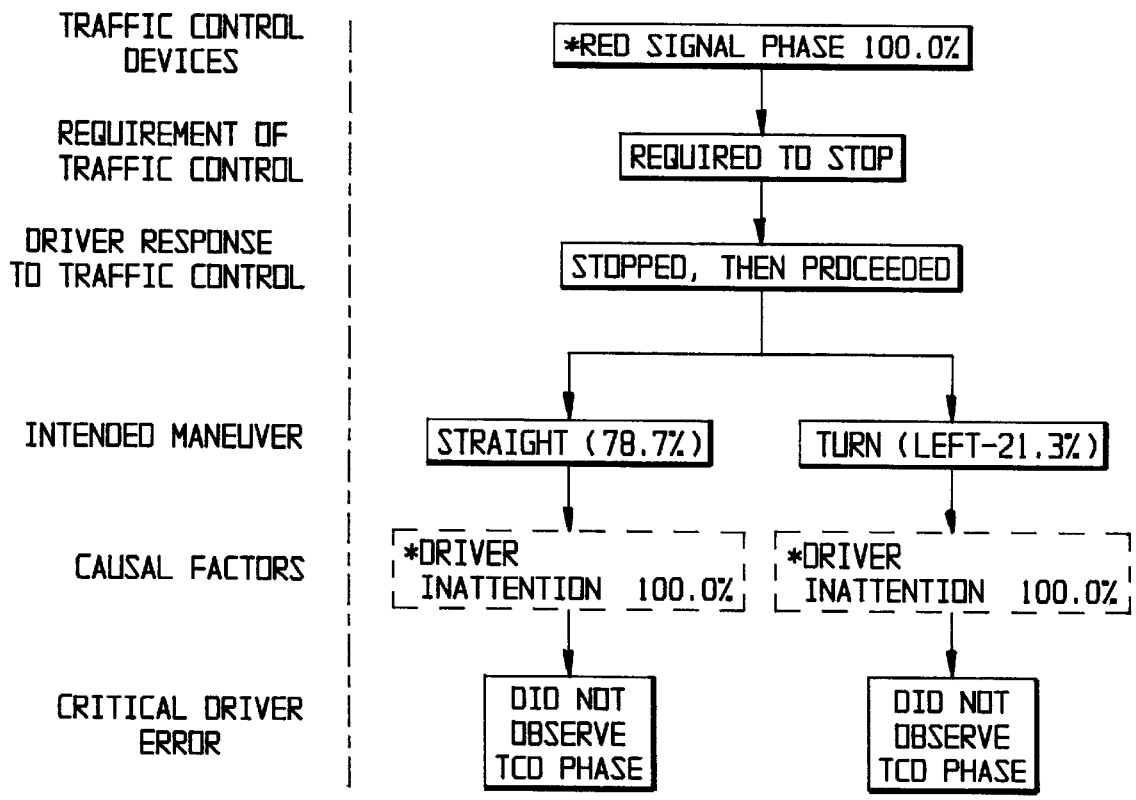

LEFT RADAR

CENTER RADAR

RIGHT RADAR

SYSTEM AND METHOD FOR AVOIDING ACCIDENTS IN INTERSECTIONS

CROSS-REFERENCE TO RELATED APPLICATIONS

The present application claims priority under 35 U.S.C. §119(e) to U.S. Patent Provisional Application No. 60/185,748, filed on Feb. 28, 2000, the disclosure of which is expressly incorporated by reference herein in its entirety. The present application also relates to pending U.S. patent application Ser. No. 09/433,717, filed Nov. 4, 1999, the disclosure of which is also expressly incorporated by reference herein in its entirety.

BACKGROUND OF THE INVENTION

1. Field of the Invention

The present invention relates to a system and method of avoiding vehicle collisions in intersections. More specifically, the present invention relates to detecting the presence of a threat vehicle approaching the same intersection as the subject vehicle.

2. Discussion of Background Information

Roadway intersections are areas of potential conflict that increase risk exposure for vehicles attempting to pass through these locations. The varying nature of intersection configurations and the number of vehicles approaching and negotiating through these sites result in a broad range of crash scenarios. Preliminary estimates by the National Highway Traffic Safety Administration (NHTSA) indicate that crossing-path crashes occurring at intersections represent approximately 26 percent of all police-reported crashes each year, approximately 1.7 million crashes per year. Consideration of non-police-reported crashes of this type raises the total number of crossing-path crashes to approximately 3.7 million per year. These crashes can be classified into four scenarios (from the perspective of a vehicle that initiates the crash events).

FIG. 1 shows the first scenario. A subject vehicle 100 is not required to stop, there is no violation of a traffic control device, and subject vehicle 100 is slowing or stopped in a traffic lane. Subject vehicle 100 may be required to yield but not stop, such that there is no violation of the control device. A majority of these cases involve subject vehicle 100 approaching a traffic signal with a displayed green phase, whereas the remaining cases involve intersections for which the direction of travel of subject vehicle 100 is not controlled by a traffic control device. The crash occurs when subject vehicle 100 attempts a left turn across the path of an oncoming threat vehicle (POV) 102. Typically, subject vehicle 100 is either slowing, or at a stop in the traffic lane.

The second scenario is shown in FIG. 2. In this case, subject vehicle 100 is required to stop by a traffic control device, stops in accordance with the control device, and proceeds into the intersection. Almost all the cases in this category are intersections controlled by stop signs along the roadway being traveled by subject vehicle 100. No traffic control is present on the roadway being traveled by other vehicle 102. The crash occurs when subject vehicle 100 attempts to traverse the intersection or to perform a left turn onto the roadway being traveled by threat vehicle 102.

FIG. 3 shows the third scenario. Although subject vehicle 100 is required to stop consistent with a traffic control device, subject vehicle 100 enters the intersection without stopping (in violation of the traffic control device). In the majority of these cases, subject vehicle 100 is proceeding straight (i.e., not turning).

The fourth scenario is shown in FIG. 4. In this case, subject vehicle 100 approaches an intersection controlled by a signal with a displayed red phase. Subject vehicle 100 stops, and then proceeds into the intersection before the signal phases to green.

Various systems, such as the VORAD collision avoidance system, and the Mercedes-Benz Stability Enhancement System, illustrate the potential to detect collision situations, and to control the stability of the vehicle during a collision avoidance maneuver. Application of these and other state-of-the-art technologies is part of a program to revolutionize transportation safety. This program, broadly titled Intelligent Transportation Systems (ITS), seeks to integrate sensors and processing equipment into automobiles to increase their safety and utility. However, these systems primarily apply to rear end and lane change collisions, and fail to provide comprehensive prevention of intersection-based collisions.

SUMMARY OF THE INVENTION

The present invention provides a method and system for avoiding intersection-based collisions between a subject vehicle and other vehicles in a manner that overcomes the drawbacks of the prior art.

The present invention includes a radar system that tracks other vehicles near an intersection. A collision avoidance system compares the predicted location of these other vehicles with the predicted location of the subject vehicle to identify potential overlap within the intersection. Appropriate warnings are issued in response to a detected overlap.

The preferred embodiment of the present invention directs the scanning angle of its left and right side radar system relatives to left and right control points on a non-parallel road. As the subject vehicle moves toward the intersection, each control point is preferably being continually recalculated to move away from the subject vehicle along the intersection to maintain a constant distance from the subject vehicle. The antenna controller points the antennas based on the position of the control point and rotates the antennas to scan in small sectors relative to the control point.

According to an embodiment of the invention, a method for a subject vehicle to avoid collisions is provided. At least one lane feeding into an intersection is scanned. The presence of a threat vehicle in the at least one lane is detected. Whether the subject vehicle and the threat vehicle will occupy the intersection at the same time is predicted. A warning is issued in response to the predicting.

According to another embodiment of the invention, a method for a subject vehicle to avoid collisions is provided. There is a separate scanning of left, right, and forward sectors of the subject vehicle in response to the subject vehicle coming within a predetermined distance of an intersection. The presence of a threat vehicle in the at least one lane is detected. Whether the subject vehicle and the threat vehicle will occupy the intersection at the same time is predicted. A warning is issued in response to the predicting.

According to yet another embodiment of the invention, a method of controlling a radar antenna mounted on a moving vehicle is provided. The radar antenna is oscillated about a predetermined angle relative to a control point, the control point representing a position in a lane feeding into an intersection. The control point is moved away from the intersection as the subject vehicle approaches the intersection.

According to still yet another embodiment of the invention, a method for preventing a subject vehicle from accidents in intersections is provided. A map is stored in a database, the map including at least one intersection with a traffic control device. Coordinate data reflecting a position of the subject vehicle is received. Whether the subject vehicle will enter an intersection of the at least one intersection in violation of an associated traffic control device is determined. A warning is issued to a driver of the subject vehicle in response to a determination that the subject vehicle will enter an intersection of the at least one intersection in violation of an associated traffic control device. An area around the intersection is scanned. Any threat vehicles in the scanned area are identified. Whether the subject vehicle and the threat vehicle will occupy the intersection at the same time is predicted. A warning is issued to the driver of the subject vehicle in response to a prediction that the subject vehicle and the threat vehicle will occupy the intersection at the same time. Whether prevailing conditions indicate a low probability of a collision in the intersection is determined. The warning to a driver of the subject vehicle is disabled in response to a prediction when the prevailing conditions indicate a low probability of a collision in the intersection.

According to yet another embodiment of the invention, a collision prevention device mounted on a subject vehicle is provided. Left, right and center radar antennas are mounted on the vehicle. A controller is programmed to oscillate the left and right radar antennas about a predetermined angle relative to left and right control points respectively, the control points representing positions in left and right lanes feeding into an intersection. The controller is also programmed to move the left and right control points away from the intersection as the subject vehicle approaches the intersection.

According to still yet another embodiment of the invention, a collision prevention device is provided. Left, right and center radar antennas are provided. A map database is also provided, where a map in the database including an intersection. A tracker is capable of distinguishing a threat vehicle approaching the intersection from other objects detected by the left, right, and center radar antennas. A controller is capable of determining whether the subject vehicle and the threat vehicle will occupy an intersection at the same time. The controller is programmed to issue a warning signal in response to whether the subject vehicle and the threat vehicle will occupy an intersection at the same time and when the prevailing conditions do not indicate a low probability of a collision in the intersection.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIGS. 1–4 illustrate crash scenarios;

FIGS. 5–8 illustrate the causes of the crash scenarios of FIGS. 1–4;

DETAILED DESCRIPTION OF THE EXEMPLARY EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A. System Overview

The above listed scenario groups present common factors that allow the crashes to be prevented by application of similar functional goal sets. Prior to discussing the countermeasure developed for these scenarios, it is beneficial to review the dynamic situation associated with each of these scenarios, all of which focus only on the actions of subject vehicle 100.

Scenario No. 1 is distinct from other scenarios due to subject vehicle 100 making a left turn across the path of threat vehicle 102. The majority of the cases corresponding to this scenario occur at intersections controlled by phased traffic signals, whereas the remainder occur at intersections with no traffic controls. FIG. 5 illustrates the crash characteristics pertinent to this scenario. In all cases, subject vehicle 100 is either slowing or stopped in the traffic lane while waiting to make a left turn.

Several factors can cause this type of crash. Over 90 percent are due to faulty perception: Looked, Did Not See (26.5 percent), Attempted to Beat Other Vehicle (24.9 percent), Vision Obstructed/Impaired (20.7 percent), and Driver Inattention (17.9 percent). The factor in each is subject vehicle 100 attempting to perform a left turn across a vehicle path with inadequate vehicle-to-vehicle gap. An appropriate countermeasure is to provide the driver of subject vehicle 100 with a warning of an inadequate gap before the driver proceeds with the turn.

Figure 1:
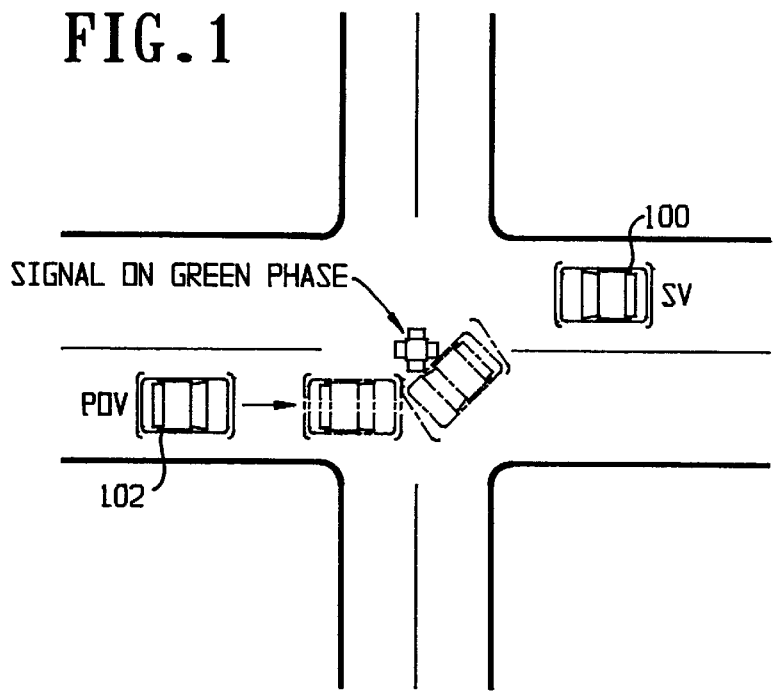
Figure 2:
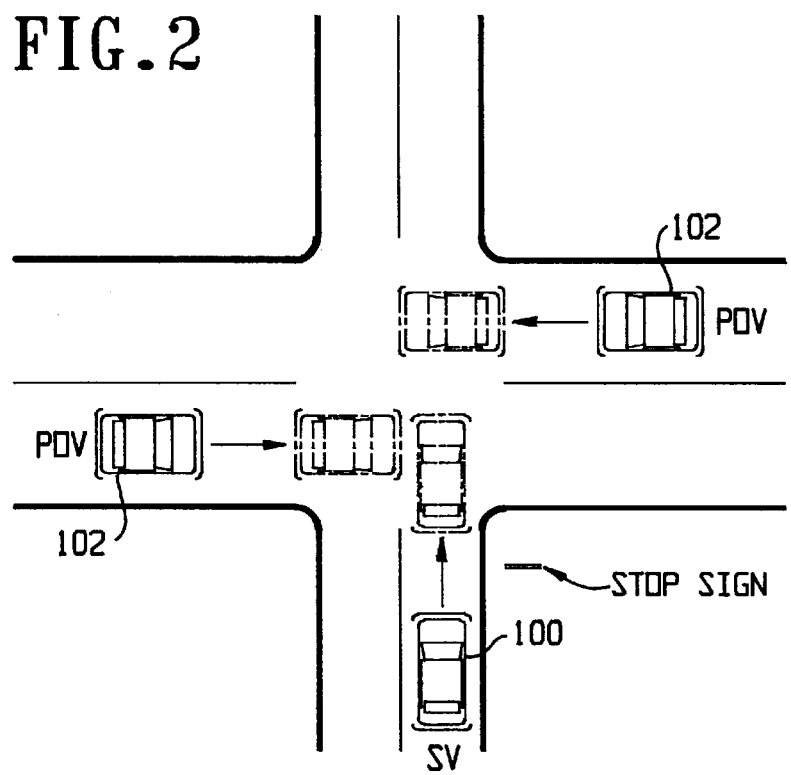
Figure 3:
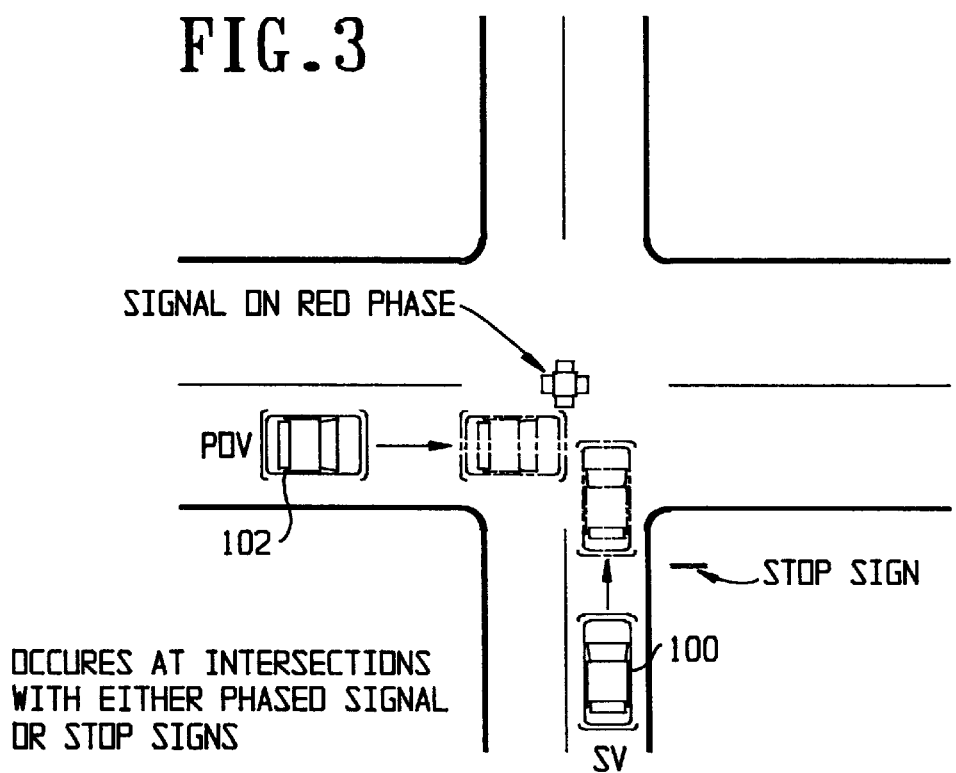
Figure 6:
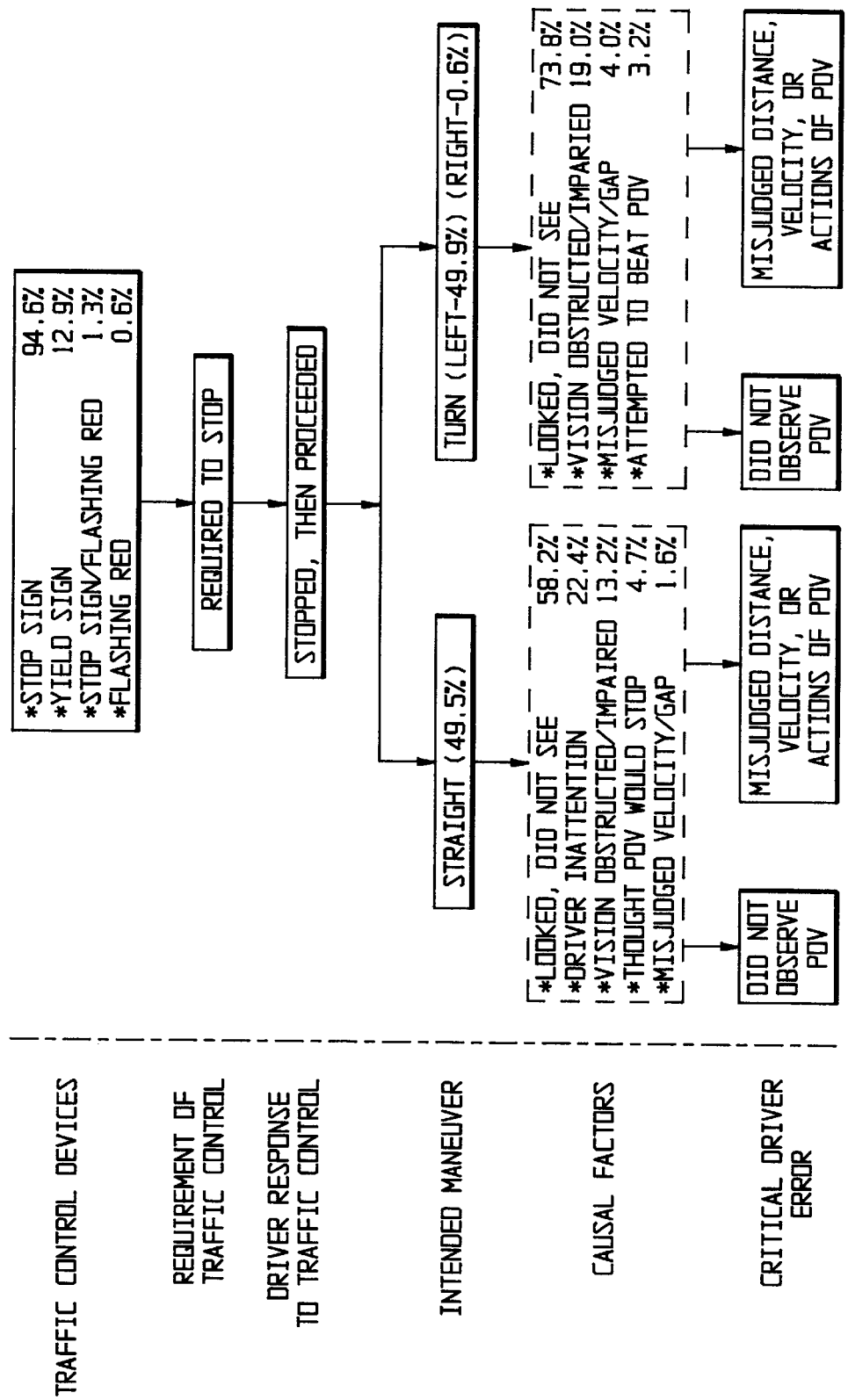

Scenario No. 2 is distinguished by the motion of subject vehicle 100. In this scenario, subject vehicle 100 stops in compliance with the traffic control device and then prematurely proceeds into the intersection. A collision occurs when subject vehicle 100 attempts to make a turn or proceed straight through the intersection. FIG. 6 illustrates the distribution of characteristics associated with this scenario. As in Scenario No. 1, the driver proceeds into the intersection with an inadequate vehicle-to-vehicle gap. While the geometry of the scenario is different due to the perpendicular path of the vehicles in this scenario, the underlying factor is the same. An appropriate countermeasure is to scan the perpendicular lanes, and to provide a warning of the approaching vehicles.

Figure 7:
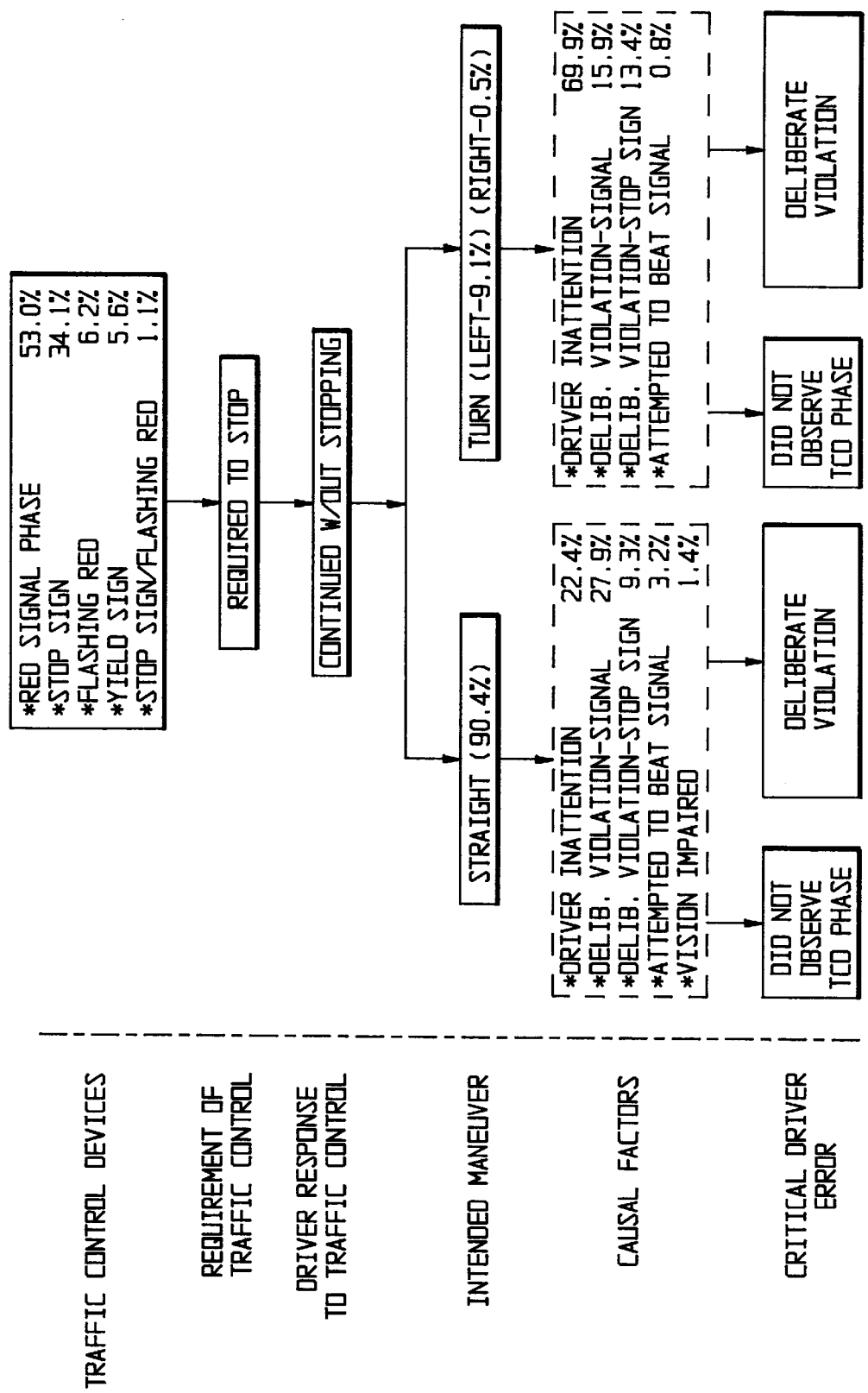

In Scenario No. 3, subject vehicle 100 proceeds through an intersection in violation of a traffic control device. FIG. 7 illustrates the characteristics associated with this scenario. In the majority of cases, subject vehicle 100 is traversing the intersection on a straight path. This maneuver influences the velocity at which the vehicle approaches the intersection, (e.g., when subject vehicle 100 is making a turn, the driver usually slows and then proceeds with the turn). An exception to this circumstance is when subject vehicle 100 is traveling at a low velocity and the driver believes that it is safe to proceed with the turn at his/her current velocity. Unlike Scenario Nos. 1 and 2, this crash scenario can be mitigated by providing the driver with a warning of the potential violation of the traffic control. A countermeasure should provide this information to the driver in time for the driver to react to the oncoming intersection.

Scenario No. 4 is distinguished by the driver of subject vehicle 100 stopping in response to a traffic signal with a displayed red phase, then proceeding into the intersection before the light phases to green. FIG. 8 illustrates the distribution of crash characteristics. In all cases for this scenario, the driver is inattentive to the driving task and does not observe the signal phase.

Figure 9:
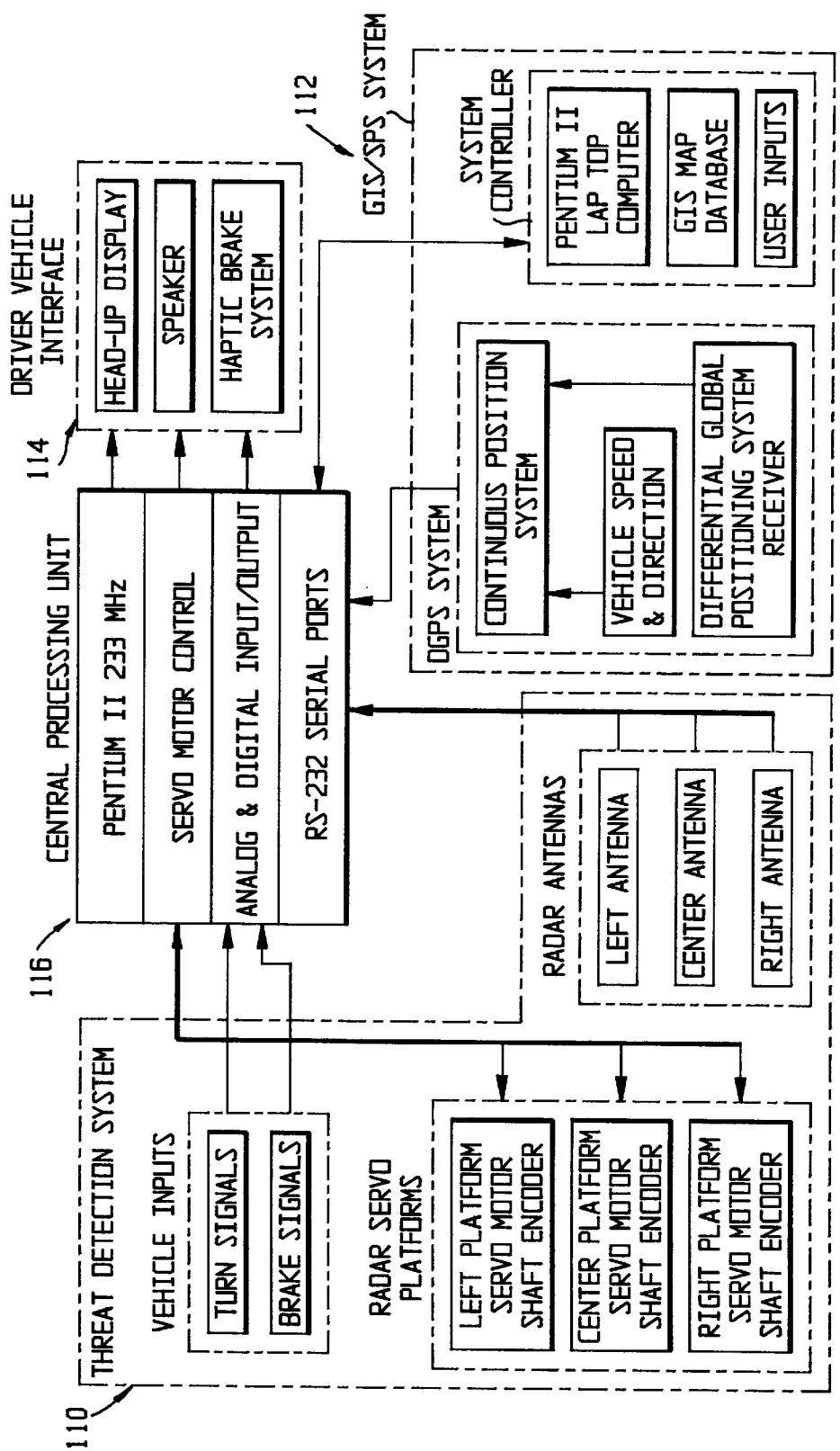
FIG. 9 illustrates the architecture of the preferred embodiment of the countermeasure system of the present invention.

The present invention provides an intersection countermeasure system 1000, which preferably includes four subsystems; a threat detection system 110, a GIS/GPS system 112, a driver vehicle interface 114, and a central processing unit (CPU) 116. FIG. 9 shows the architecture of countermeasure system 1000.

Threat detection system 110 utilizes millimeter wave radar units to acquire data on vehicles approaching the intersection, preferably three VORAD EVT-200 radar units operating at 24 GHz. The radar units are modified at the factory to provide range and range rate data to CPU 116 through an RS-232 link. The radar antennas are mounted to motorized gear-driven scan platforms to be pointed to specific areas of the intersection as the vehicle approaches the intersection. The controller provides angular position data. The scan platform is designed to allow the antenna to be positioned, through computer control, to the adjacent roadways of the intersection the vehicle is approaching. Three scan platforms are preferably utilized; two on the vehicle roof to monitor the non-parallel and one forward-looking unit to monitor the parallel roadway. Standard VORAD electronics in threat detection system 110 are preferably used to process the data coming out of the antennas to provide resulting range and range rate data for the closest targets within the maximum radar range. A tracker utilizes radar data, in conjunction with information on the intersection provided by an onboard map database, to determine if subject vehicle 100 will occupy the intersection at the same time as vehicles on crossroads, or parallel direction paths, approaching the intersection.

The Geographical Information System/Global Positioning System (GIS/GPS) 112 preferably includes a GPS receiver, a differential correction receiver, and an onboard GIS map database. The system uses differentially corrected position information provided by the global GPS network to place subject vehicle 100 on a specific roadway identified in the map database. The map database contains information about the location of intersections, along with roadways. This map database is preferably provided by Navigation Technologies, Inc. (NavTech), and includes roadway and intersection details (including intersection control devices). This information is used by the countermeasure to locate subject vehicle 100 on a roadway, and to determine distance between subject vehicle 100 and the upcoming intersection ("distance to intersection"). With the distance to intersection known, the speed of the vehicle can be acquired from vehicle sensors, such as the speedometer, and used to calculate the braking effort required to prevent intersection entry.

The driver vehicle interface 114 transmits warnings to the vehicle driver using multiple sensory modes to transmit the warnings. Driver vehicle interface 114 includes a heads-up display (HUD), auditory system, and braking warning system. This system can also trigger a secondary computer controlled brake system when the $a_p$ (acceleration required to prevent intersection entry) threshold is exceeded. The braking system provides multiple deceleration pulses to warn the driver of the intersection and to react to it.

The present invention assists in preventing the driver of an equipped vehicle from making a mistake in judgment or perception that results in one of the four crash scenarios discussed above. In addition, the present invention can address situations in which the action (or lack thereof) that triggers the crash is initiated by the driver of other vehicle 102. The two primary defensive collision scenarios are a left turn across a path (Scenario No. 1) and violation of traffic control (Scenario No. 3). While the dynamics of the scenario do not change, the role each vehicle plays in the scenario is reversed.

Figure 10:
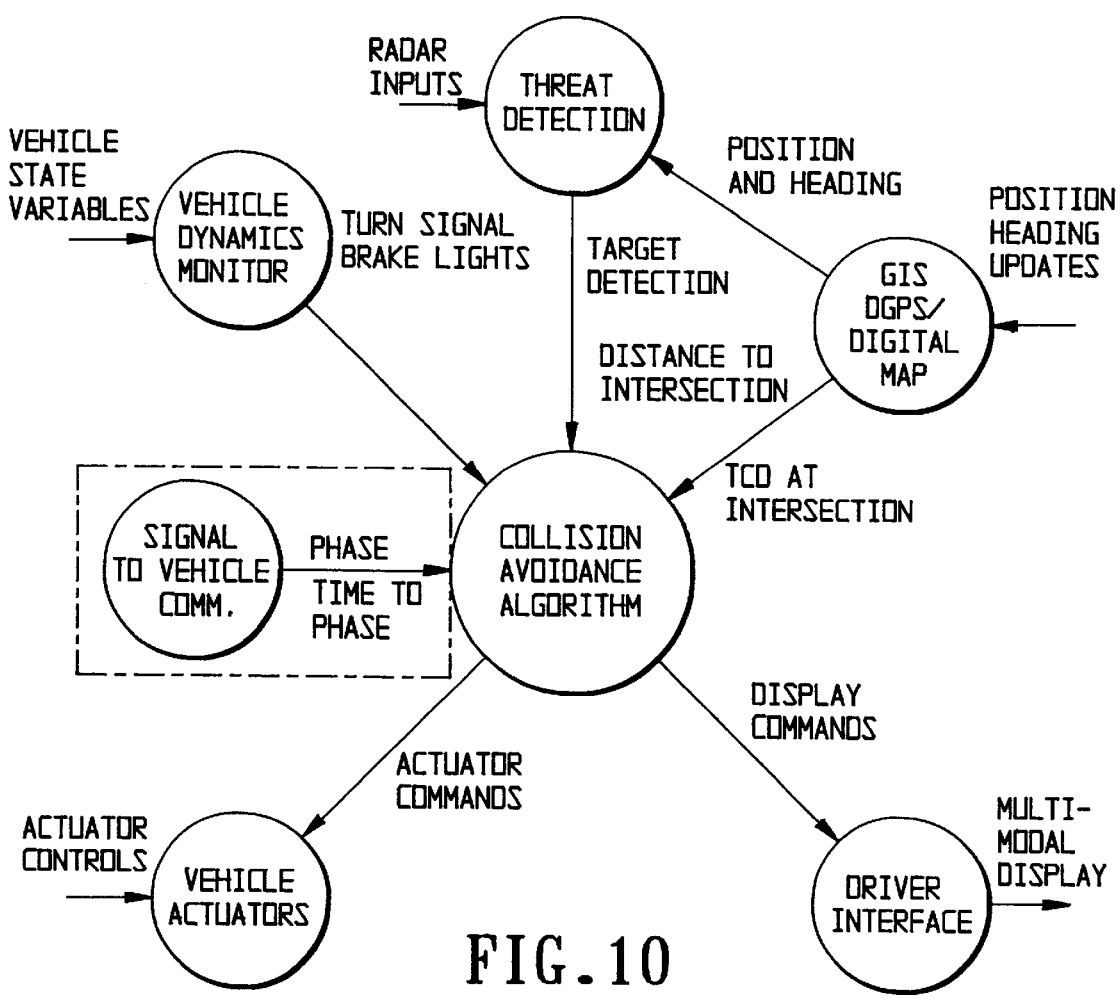
FIG. 10 illustrates the interchange of data between the components of the embodiment of FIG. 9.

The equipment and systems described herein provide data to a collision avoidance algorithm 118. The algorithm is a set of instructions that processes the incoming data and provides the driver with warnings when specific thresholds are exceeded. FIGS. 9 and 10 illustrates the interchange of data between the components of countermeasure system 1000. A signal to vehicle communication system (shown in FIG. 10 only as dotted lines) may also be included if the system is intended to be responsive to traffic control device phased light signals.

Figure 11:
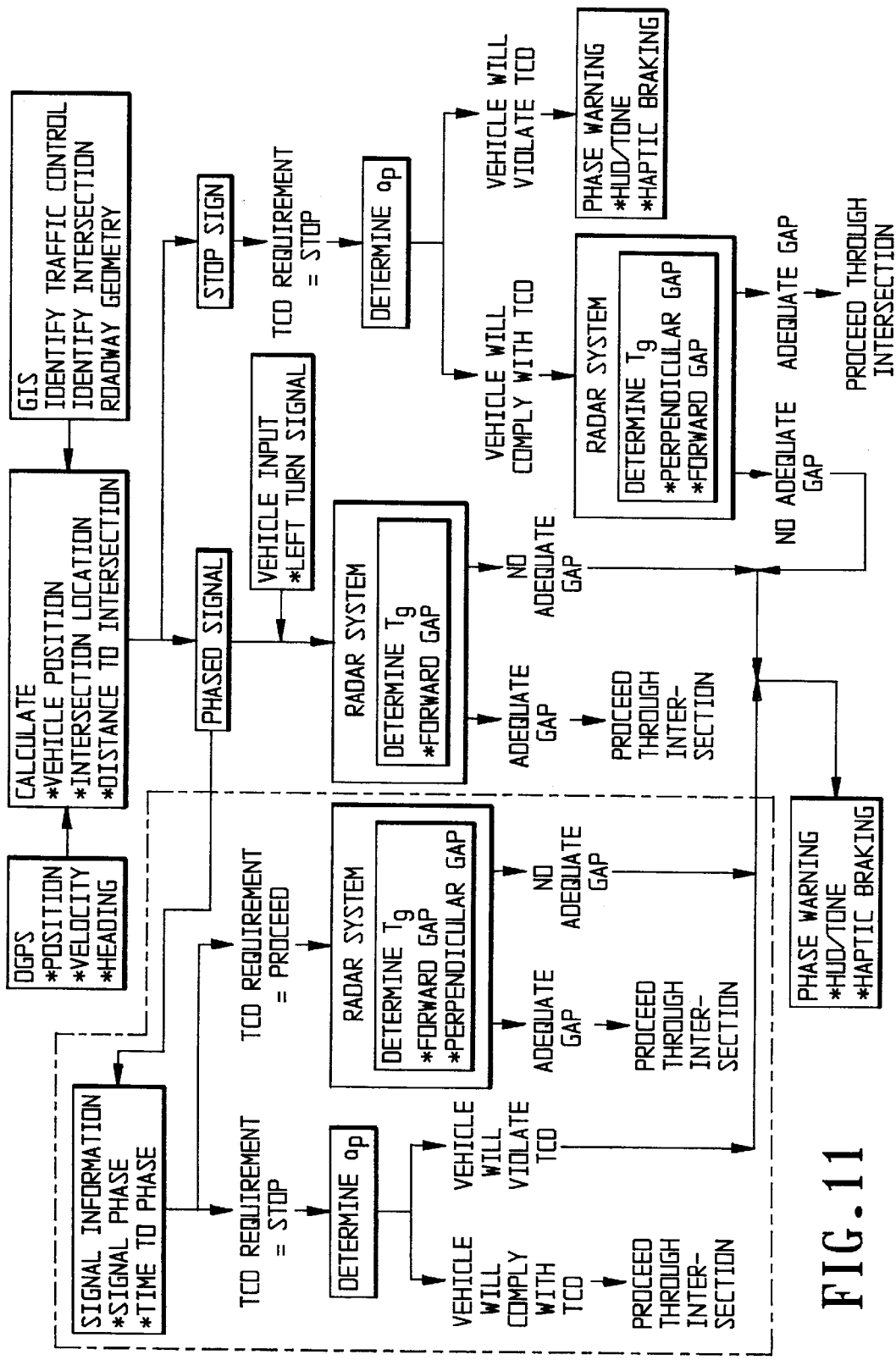
FIG. 11 illustrates the algorithm for the embodiment of FIG. 9.

Data from the vehicle systems is received for processing and issuing of warnings. Algorithm 118 monitors $a_p$ and $t_g$ (gap time to approaching vehicles). Based on the calculated values for these metrics, a warning is provided to the driver of the countermeasure-equipped vehicle. FIG. 11 illustrates the algorithm for the overall system.

Algorithm 118 processes data from the DGPS system in subject vehicle 100 to locate the vehicle's position. This position is correlated with the location of a roadway in the GIS map. If system inaccuracy in either the DGPS or GIS places the vehicle off the roadway, software corrects the location of the vehicle onto the nearest road. DGPS is preferred due to its superior accuracy compared to GPS only, although GPS alone or other forms of position location may be used. With the roadway located, the vehicle heading and vehicle speed (as acquired from the DGPS equipment and/or onboard sensors) can be used to identify the intersection the vehicle is approaching. The GIS uses the discrete intersection ID to determine the geometry of the intersection, whether four way, junction right/left, "T" or other types of intersection, and the traffic control at the intersection. The onboard processing equipment calculates the distance to the intersection for use by the warning algorithms.

The appropriate countermeasure can differ based on the traffic control device at a particular intersection. When the vehicle is approaching an intersection controlled by a stop sign, the system must determine (1) the driver's compliance with the traffic control, and (2) if the driver has an acceptable vehicle-to-vehicle gap with which to enter the intersection. A driver approaching an intersection controlled by a stop sign is always required to stop, check for a gap to proceed, and then traverse the intersection. The system determines driver compliance with the stop sign by monitoring the $a_p$ metric (e.g., vehicle speed with respect to distance to intersection) and calculates the necessary braking effort required to prevent the vehicle from entering the intersection. The system issues a warning if the value of $a_p$ exceeds 0.35 g.

If the driver is reacting to the intersection by slowing in order to stop, the vehicle threat detection system 110 scans the intersection to determine the presence of threat vehicles 102. As subject vehicle 100 approaches the intersection, the system positions the radar units to accommodate the configuration of the intersection (provided by the map database within the GIS). Threat detection system 110 monitors range and range rates of threat vehicles 102 approaching the intersection. A tracker will determine, based on the above data (e.g., position, speed, distance, and acceleration), whether subject vehicle 100 and one or more target vehicles 102 will occupy the intersection at the same time.

Joint co-occupancy of the intersection by subject vehicle 100 and any target vehicle 102 will initiate a warning to the driver, although the warning may be disabled if the vehicle is slowly approaching an intersection (the logic recognizes that the vehicle can stop in a very small distance, and therefore disables the warning to reduce false alarms). If the driver can safely traverse the intersection, then no alarm is provided. On the other hand, if there is an inadequate gap and/or if the driver is not slowing, the driver vehicle interface delivers an appropriate alarm to the driver of subject vehicle 100.

The processing for subject vehicle 100 approaching a phased signal is similar to that for a stop sign. A signal to the vehicle communication system (if present) provides subject vehicle 100 with information regarding the present signal phase and the time until the signal phases; this information would be broadcast from each signal for each approaching roadway, along with intersection ID information, from which the requirement to stop for the driver can be determined. If subject vehicle 100, while maintaining current velocity and direction, can traverse the intersection in the time remaining to signal phasing (assuming the signal phase is green), then no warning is provided. If, however, the time is insufficient, a warning is transmitted to the driver. This is similar to calculating $a_p$ for a stop-sign-controlled intersection. Whereas the $a_p$ for stop signs uses distance to intersection, and then calculates the braking effort required, the warning metric for phased signals substitutes the time to signal phase and calculates if the subject vehicle can clear the intersection based on vehicle velocity and distance to clear the intersection. When the driver stops prior to intersection entry, the threat detection system operates in a like manner as described for stop signs, calculating approaching vehicle paths, and determining those vehicles that will occupy the intersection at the same time as subject vehicle 100. This also happens when the vehicle enters the intersection with the green signal phase, and there is no requirement to stop.

Without the signal to the vehicle communication system, the countermeasure cannot warn the driver of the potential for violating the phased signal traffic control; instead, the system can only warn the driver if proceeding into the intersection with an inadequate gap. If the countermeasure receives input that the driver will perform a left turn (e.g., through the activation of the left turn signal), then countermeasure system 1000 responds consistent with the manner discussed above for stop signs.

Once the intersection has been safely traversed by subject vehicle 100, the countermeasure locates the next intersection and repeats the above.

In Scenario No. 1, the left turn across path crash occurs primarily at phased signals when the signal is green and subject vehicle 100 is not required to stop. An object of the preferred embodiment of the present invention is to assure that the driver proceeds with an adequate gap relative to threat vehicles 102. Countermeasure system 1000 uses data from the DGPS and GIS data to provide intersection geometry characteristics. Additional information regarding driver intent, provided by activation of the vehicle turn signal, is preferably used to activate or disable specific warning logic.

Figure 12:
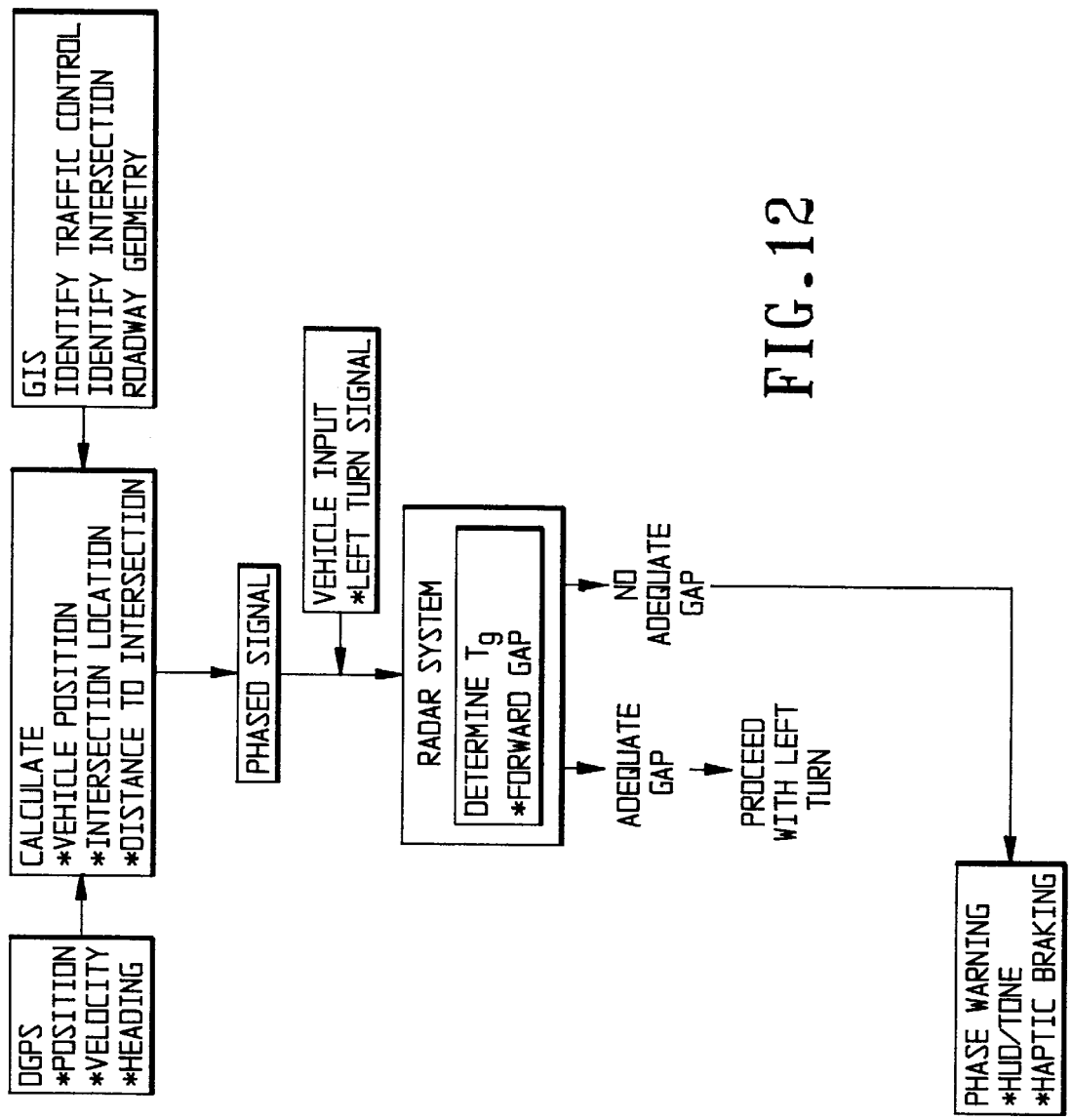
FIGS. 12–15 illustrate the algorithm pathway of FIG. 11 for the crash scenarios of FIGS. 1–4, respectively.

FIG. 12 illustrates the algorithm pathway for Scenario No. 1. Activation of the turn signal engages the warning logic for the forward radar unit. The radar system is preferably functioning at all times, and only the logic impedes the ability to provide a warning. The radar system acquires range and range-rate data for the vehicles approaching the intersection on the parallel but opposite direction from subject vehicle 100. The data is processed by countermeasure system 1000, which predicts if any threat vehicles 102 will occupy the intersection at the same time as subject vehicle 100. If countermeasure system 1000 determines/predicts that an acceptable gap is present, then no warning is provided to the driver and the left turn can be executed safely by SV 100. On the other hand, if the vehicles will occupy the intersection at the same time and no adequate gap exists, then a warning is issued. The warning may include an audio tone, an icon on the HUD display, and/or pulsing of the brake system (if appropriate).

Figure 13:
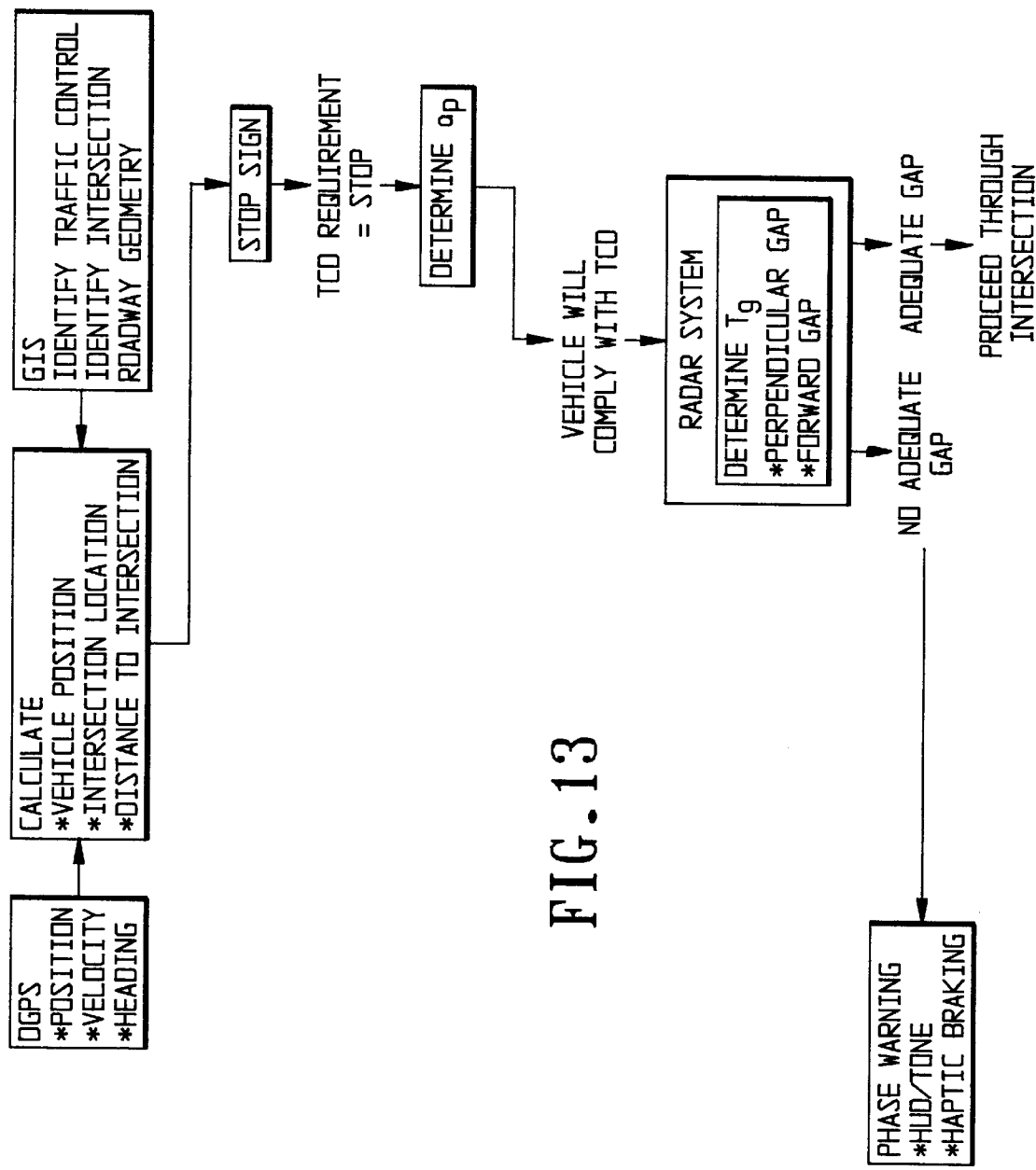

Scenario No. 2 entails vehicles on perpendicular paths, with no violation of the traffic control (always a stop sign). The driver complies with the traffic control and comes to a complete stop at the intersection. After checking all directions of traffic, the driver improperly enters the intersection and collides with one or more target vehicles traveling on perpendicular roadways. These crashes are caused primarily by the driver's failure to perceive the approaching target vehicles 102, or to misperceive the distance to the approaching target vehicles 102. FIG. 13 illustrates the appropriate countermeasure, in which the threat detection system 110 tracks threat vehicles 102 on the crossroads to provide a warning in the case of insufficient gaps.

Figure 14:
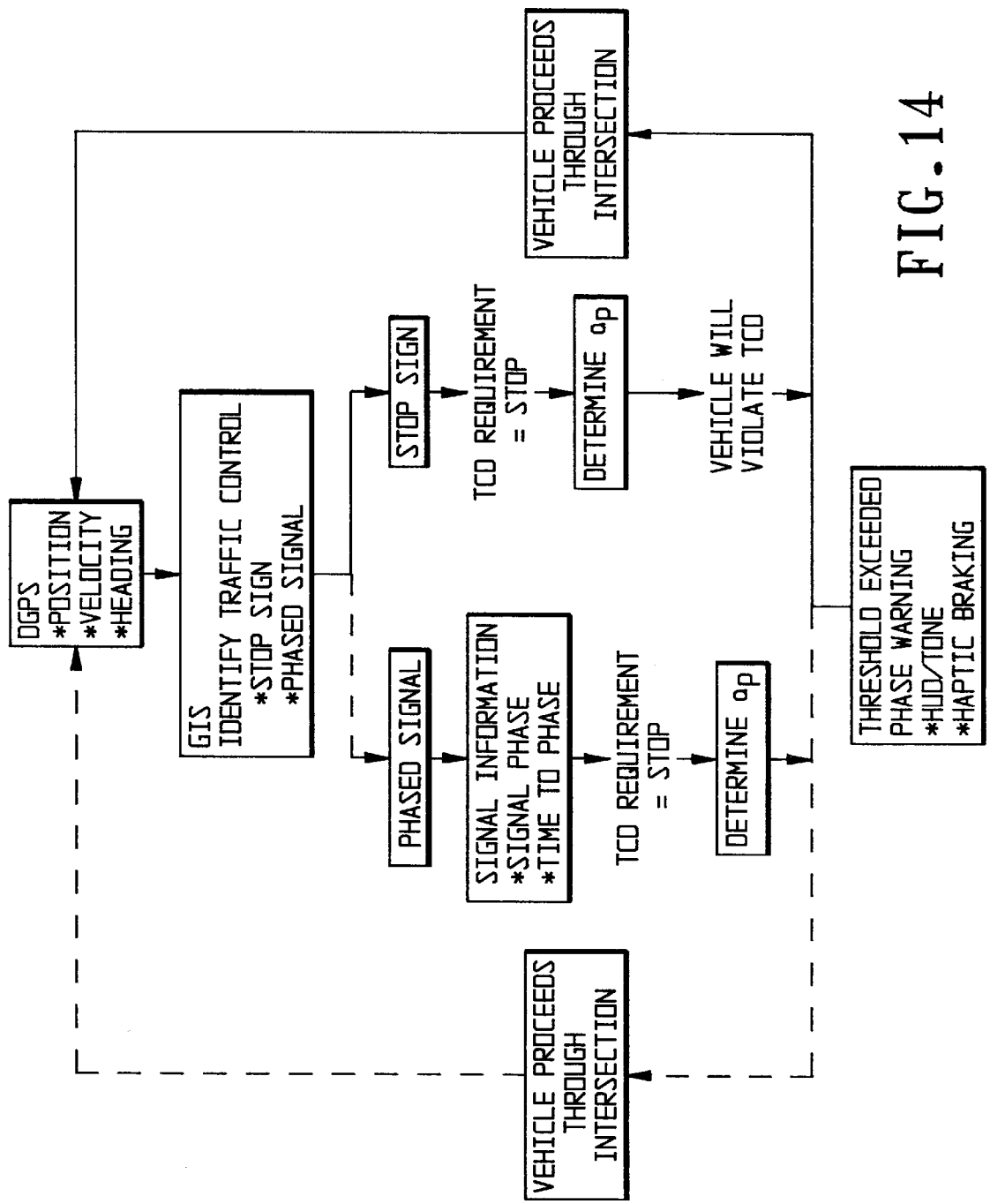

Scenario No. 3 differs from Scenario No. 2 in that subject vehicle 100 violates the traffic control. FIG. 14 illustrates the processing of the countermeasure for this scenario, which is designed to prevent violation of the traffic control. If the traffic control is a stop sign, the vehicle must determine the driver's compliance with the traffic control, and then whether the driver has an acceptable vehicle to-vehicle-gap with which to enter the intersection. Countermeasure 1000 determines driver compliance with the stop sign by monitoring an $a_p$ metric, which represents the amount of acceleration required to prevent vehicle entry into the intersection:

$$a_p = \frac{(T_d v + 0.36\, v + v^2)/d}{32.2}$$

where:
$T_d$=time from driver recognition (typically approximately two seconds)
v=vehicle velocity (ft./sec.)
d=distance to intersection (ft.)

Countermeasure 1000 calculates the braking effort that is required to prevent the vehicle from entering the intersection. Drivers provide cues, such as applying the vehicle brakes, before arriving at the intersection. This behavior can be captured by monitoring the $a_p$ metric. A warning is provided if the value of $a_p$ exceeds 0.35 g.

For a phased signal, the processing is similar, except that the requirement to stop is dependent upon the status of the phased signal received through the signal-to-vehicle communication system. If countermeasure system 1000 receives input that the driver will perform a left turn (e.g., through the activation of the left turn signal), then the scenario reverts to Scenario No. 1, where the threat detection system 110 accesses the distance to threat vehicle 102 approaching the intersection in a parallel, but opposite direction. The determination by countermeasure system 1000 that an inadequate gap to one or more approaching threat vehicles will initiate a warning to the driver through driver vehicle interface 114.

The signal-to-vehicle communication system can provide information to countermeasure system 1000 regarding the present signal phase, and the time to phasing. This information would be broadcast from each signal for each approaching roadway, along with intersection ID information. With the present signal phase and the time to phasing information acquired from the signal, the requirement to stop for the driver can be determined. If the vehicle, while maintaining current velocity and direction, can traverse the intersection in the time remaining to signal phasing (assuming the signal phase is green), then no warning is provided. If, however, the time is insufficient, a warning is transmitted to the driver. This process parallels calculating $a_p$ for stop-sign-controlled intersections. Whereas the $a_p$ for stop signs uses distance to intersection, and then calculates the braking effort required, the warning metric for phased signals substitutes the time-to-signal phase and calculates if SV 100 can clear the intersection based on the vehicle speed and the distance to clear the intersection. When the driver stops prior to intersection entry, the threat detection system operates in a like manner as described for stop signs, calculating approaching vehicle paths, and determining those vehicles that will occupy the intersection at the same time as subject vehicle 100. This also happens when the vehicle enters the intersection with the green signal phase, and there is no requirement to stop.

If the embodiment does not support a signal to vehicle communication system, countermeasure 1000 can only warn the driver if subject vehicle 100 is proceeding into the intersection with an inadequate gap.

Scenario No. 4 occurs generally at intersections controlled by phased signals with left turn permissive lanes. The accident is precipitated by the premature entry into the intersection of an SV driver proceeding straight across the intersection. The driver, through inattention, does not observe that the left turn arrow only has been activated. Thinking that subject vehicle 100 is allowed to proceed, it enters the intersection and collides with another vehicle.

Figure 15:
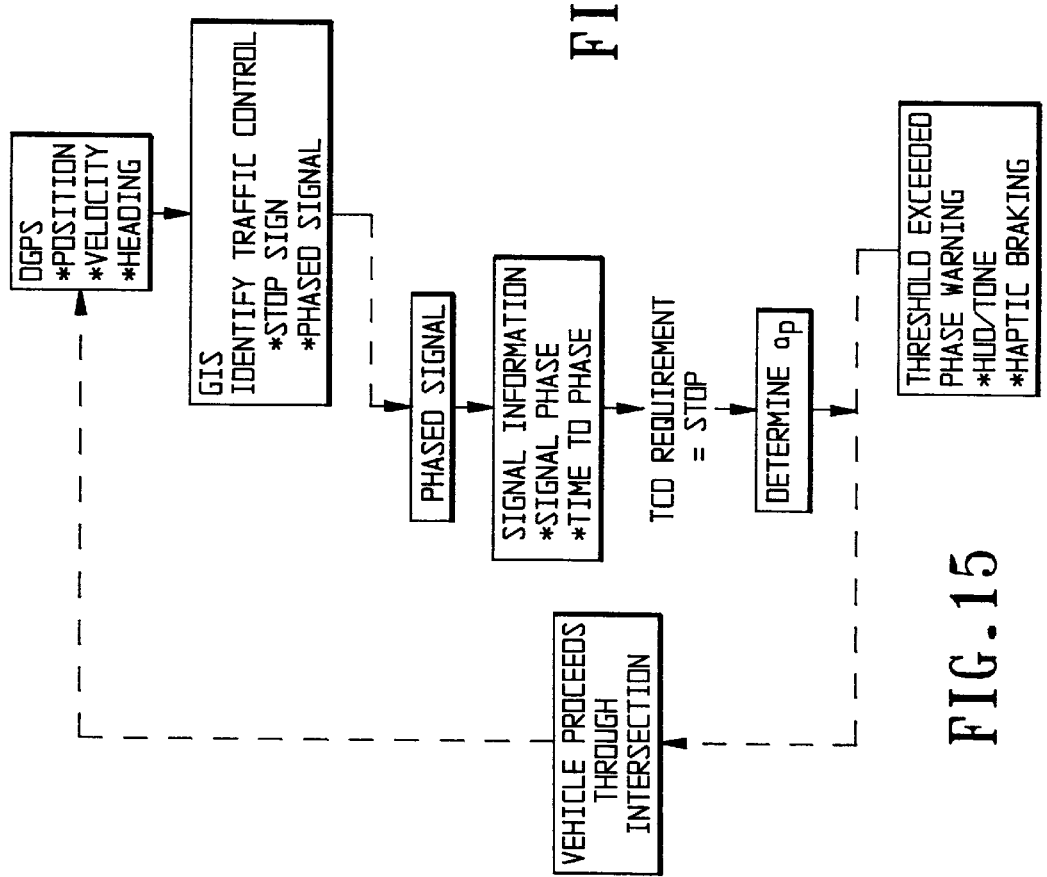

FIG. 15 illustrates the processing for this case. The communication system provides subject vehicle 100 signal phase information, indicating driver requirement. With the signal red, countermeasure system 1000 determines that the driver is not allowed to enter the intersection and issues a warning in response to a violation.

B. Specific Sub-Systems

Figure 16:
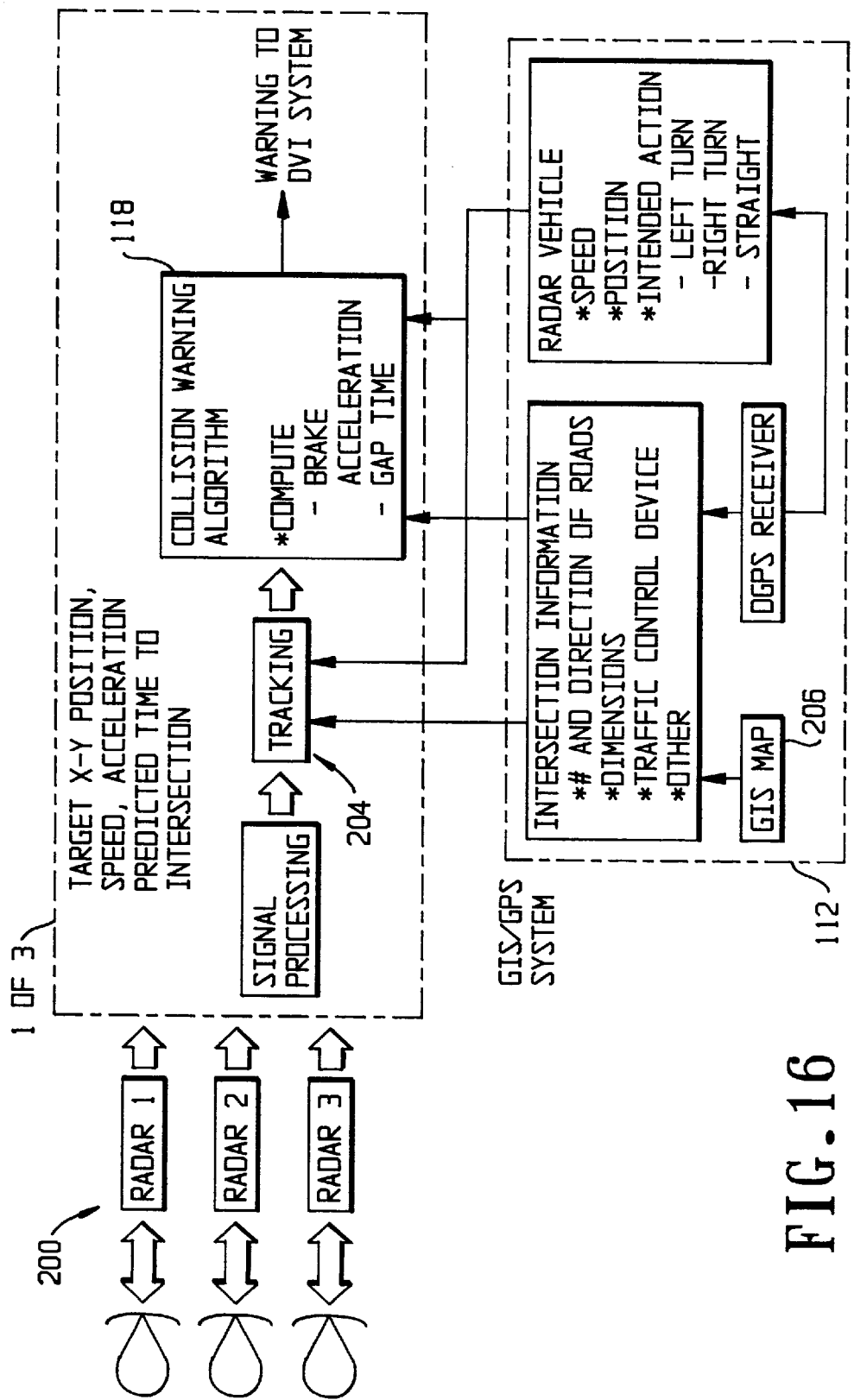
FIG. 16 illustrates a system architecture of a preferred embodiment of the invention.

FIG. 16 illustrates a functional architecture of a preferred embodiment of countermeasure system 1000 of the invention. A radar system 200 (including left, right, and center radar units) scans three principal threat sectors: left, center and right. A differential Global Positioning System (GPS) receiver 208 in GPS/GIS 112 provides the location of subject vehicle 100 at an update rate of about 10 Hz. A tracker 204, preferably a Kalman/Filter tracker, tracks each valid target. A GIS map 206 identifies an intersection in terms of its latitude and longitude. A warning algorithm 118 issues warnings to the driver of subject vehicle 100 if subject vehicle 100 is predicted to occupy the intersection at the same time that any threat vehicle is predicted to occupy the intersection. The various processing components are preferably inherent on CPU 116.

Figure 17:
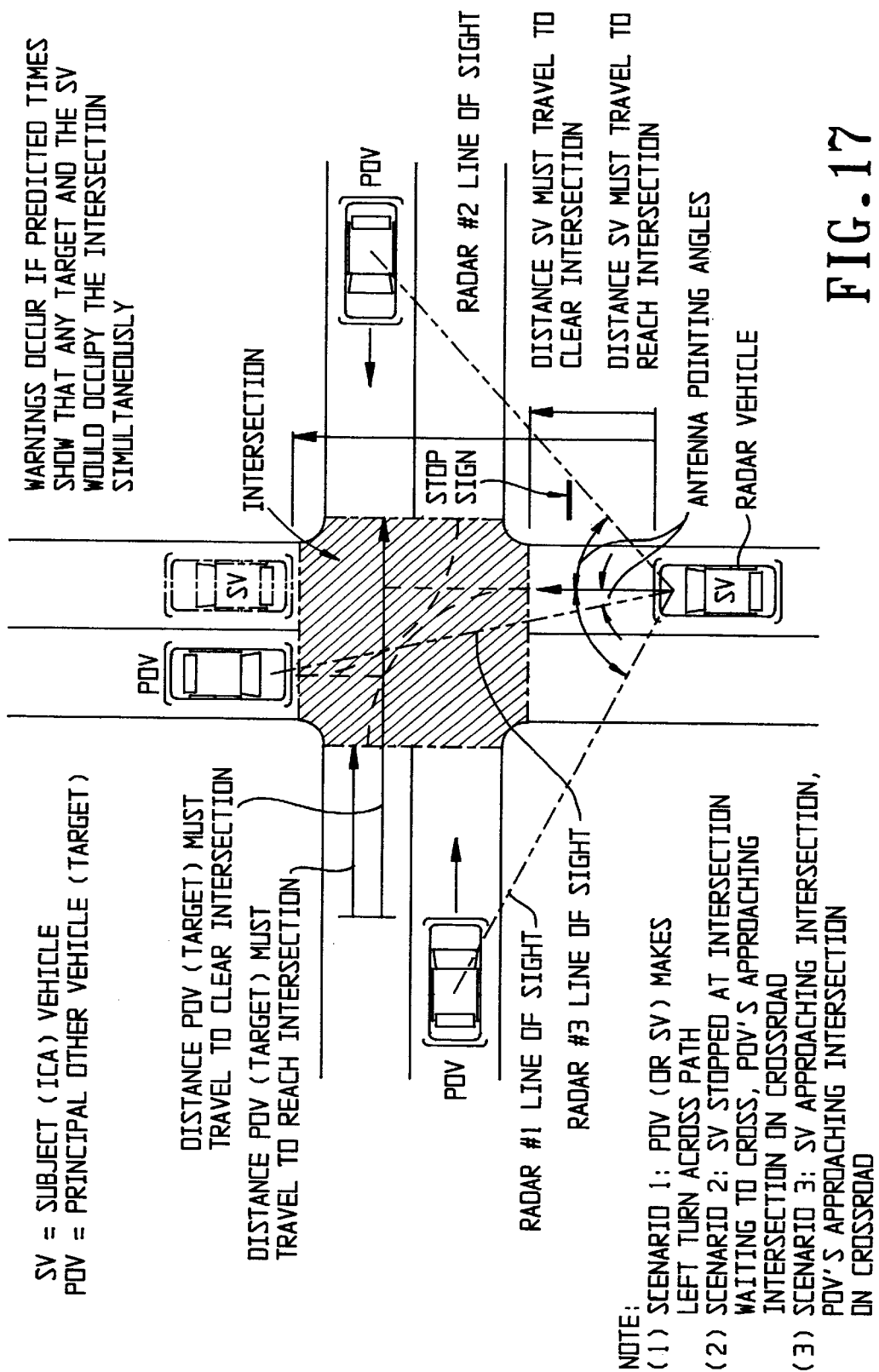
FIG. 17 illustrates an orthogonal intersection of four two-lane roads.

FIG. 17 illustrates an orthogonal intersection of four two-lane roads. The size of the intersection depends on lane width, number of lanes and the curb radius. The location of the intersection is provided by GIS map 206, for which the center of each intersection is identified by longitude and latitude 208. GPS on board subject vehicle 100 determines the position of subject vehicle 100. Threat vehicles 102 are located by radar system 200.

Figure 18:
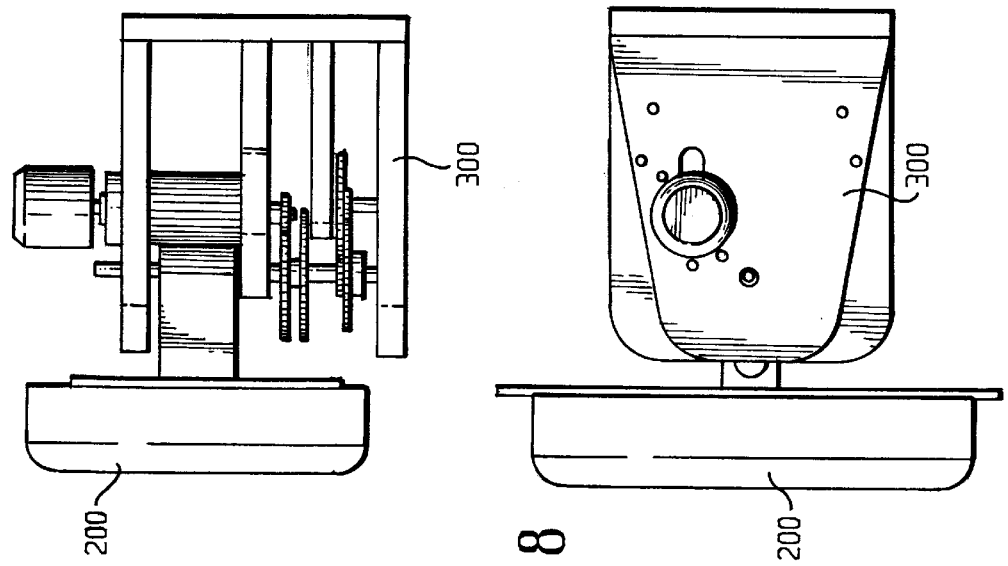
FIG. 18 illustrates a radar unit of the preferred embodiment of the invention.

Referring now to FIG. 18, each radar unit of radar system 200 is mounted on a computer-controlled servo platform 300. Each radar is preferably an EATON/VORAD radar, model EVT-200, "range-on-doppler" type radar. The preferred parameters of each radar 200 include: Frequency of 24.7 GHz; Max Instrumented Range of 395 feet; Range Resolution of 1.6 feet; Velocity Resolution of 0.13 fps; Azimuth/Elevation Beamwidth of 4/5.5 degrees; and Update Rate 10 Hz.

The antenna of the left radar unit points along the left crossroad with a small scan pattern in azimuth superimposed to improve angular coverage. The resulting scan angle is based on a control point in the roadway. The control point is preferably determined as the center point on the cross road that is at the maximum radial range of the antenna (preferably 390 feet, although other ranges, including those less than the radar maximum, could be used). The control point is preferably recalculated every 100 msec after SV 100 passes the antenna deployment range (preferably 300 feet from the center of the intersection). Thus, the control point slides outward on the cross road as SV 100 approaches the intersection such that the distance between the control point and subject vehicle 100 remains substantially constant. As discussed below, an angle is added to the bearing of the control point to drive the antenna in an oscillating sector scan relative to the control point, and preferably about the control point.

In the preferred embodiment, in which the radar range is 390 feet and the antenna deployment range is 300 feet, the initial position of the control point for a perpendicular cross road would be approximately 245 feet from the center of the intersection.

The antenna of the right radar unit similarly scans the right crossroad with a small scan pattern in azimuth superimposed to improve angular coverage.

Figure 19:
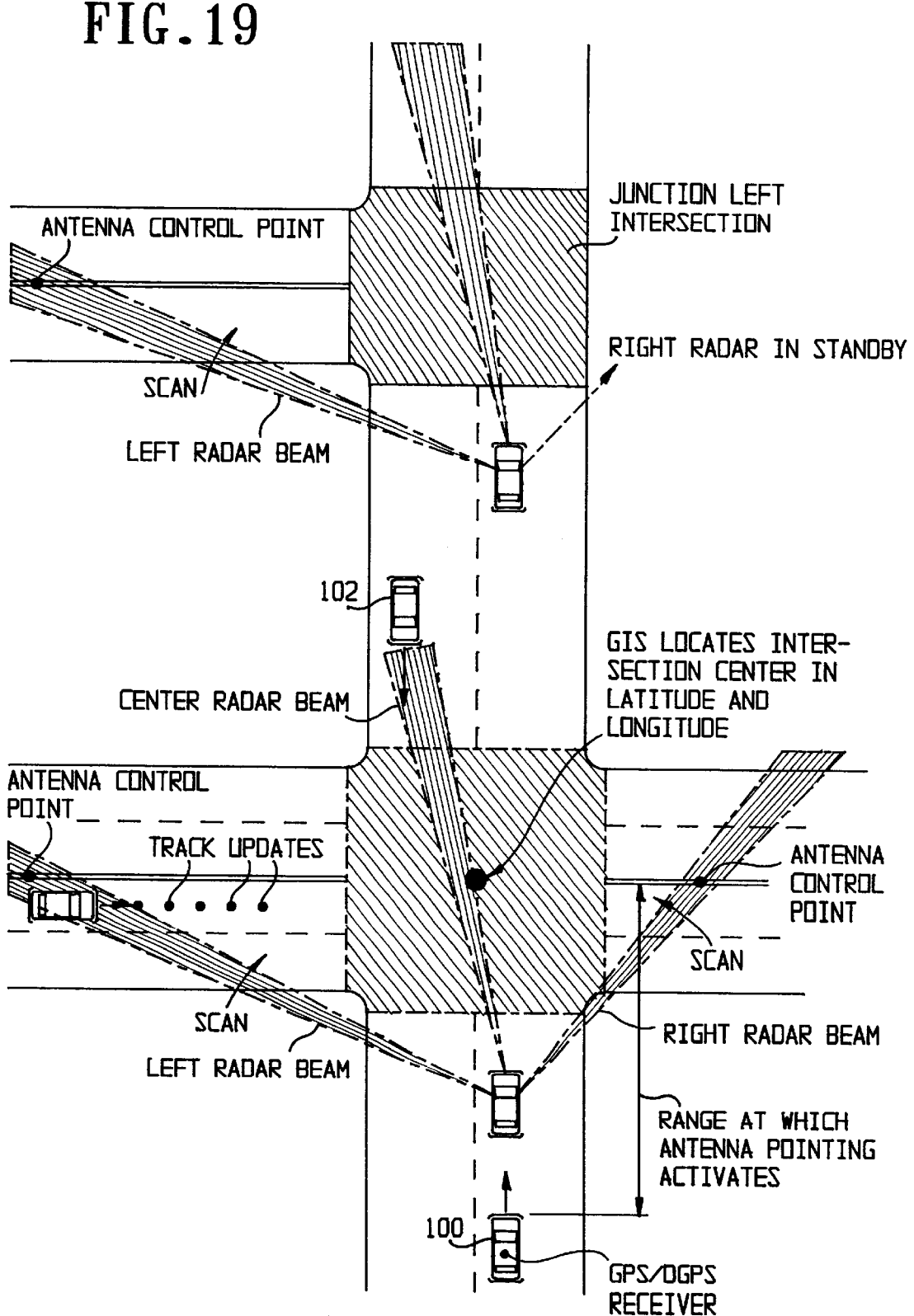
FIG. 19 illustrates a real-time scenario as a subject vehicle encounters intersections along a route that has been digitized into GIS map in accordance with the preferred embodiment of the invention.

FIG. 19 illustrates a real-time scenario as subject vehicle 100 encounters intersections along a route that has been digitized into GIS map 206. As subject vehicle 100 approaches an intersection, the two side-looking antennas rotate from a standby position towards the control point. Since the radar beamwidth is preferably 4°, the observation of the crossroad directions must be supplemented with a small sector about the dynamic pointing angle (a scan angle). The scan angle is preferably less than 20° and need not be symmetric about the pointing angle.

The scan pattern is controlled by the antenna platform motion controller. For static situations with subject vehicle 100 at the edge of the intersection (as if waiting for a signal), the antenna pointing angles are in the range of 70°-90° for an orthogonal intersection. For intersections which do not have a street in the sector covered by a particular radar unit, that radar unit can be placed in a standby/inactive mode or position. The center radar 200 scans ahead of subject vehicle 100, and therefore only requires a scan about a pointing angle of a few degrees.

Left radar 200 scans based on an algorithm that maintains the radar pointing at a control point on the roadway. Initially, the control point is approximately 390 feet from the radar, at a bearing angle greater than the initial antenna pointing angle of approximately 31° off from subject vehicle 100, and from which the left and right radar units scan back and forth by 10°-15°. The relationship between the control point and the movement of subject vehicle 100 is updated every 100 msec, although the scan angle of each radar unit is preferably updated only at the end of each scan. At the end of the outward scan, the left and right radar units will preferably point to their corresponding control point. However, the radar units may be otherwise positioned relative to the control point, as long as the relationship remains constant.

The angles also account for changes in the vehicle heading. For example, if a driver stops at an intersection with the vehicle heading 10° from the road heading (e.g., preparing to make a right turn) the radar scan angles will be compensated and the scan will still point to the control point.

The left and right radar units of radar system 200 preferably are scanning actively only when subject vehicle 100 is within approximately 300 feet of the intersection and until SV 100 leaves the defined intersection. At distances greater than 300 feet, the left and right radar of radar system 200 are preferably positioned at standby, 31° off center.

Figure 20:
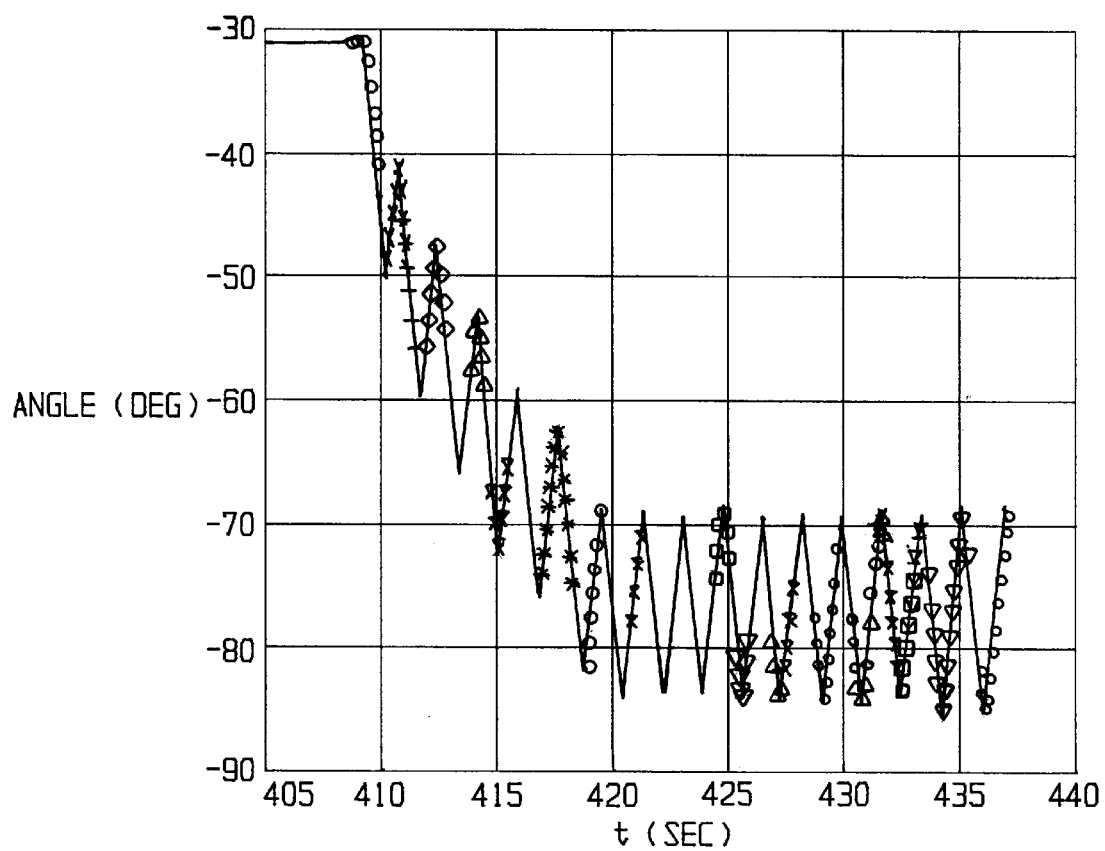
FIG. 20 illustrates changes in scanning angle range according to the preferred embodiment of the invention as a subject vehicle approaches an orthogonal intersection.

FIG. 20 illustrates a typical scan for the left radar of radar system 200 as subject vehicle 100 approaches an orthogonal intersection. The initial position of the radar is at −31° relative to the vehicle's heading (negative angles are to the left and positive angles are to the right when looking forward). When subject vehicle 100 is 300 feet from the intersection (based on the GPS/GIS information), the left radar of radar system 200 begins to actively scan outward. At approximately 421 seconds, the vehicle is stopped at the intersection and the radar maintains a 15° scan. The symbols on the plot in FIG. 20 represent that radar system 200 detects between 5 to 15 returns from each threat vehicle 102 passing through the radar beam. Tracker 204 preferably requires that a threat vehicle be detected at least twice to establish a track, and possibly more to accurately determine the acceleration of threat vehicle 102. The scan range is preferably 10° to 15°.

Figure 21:
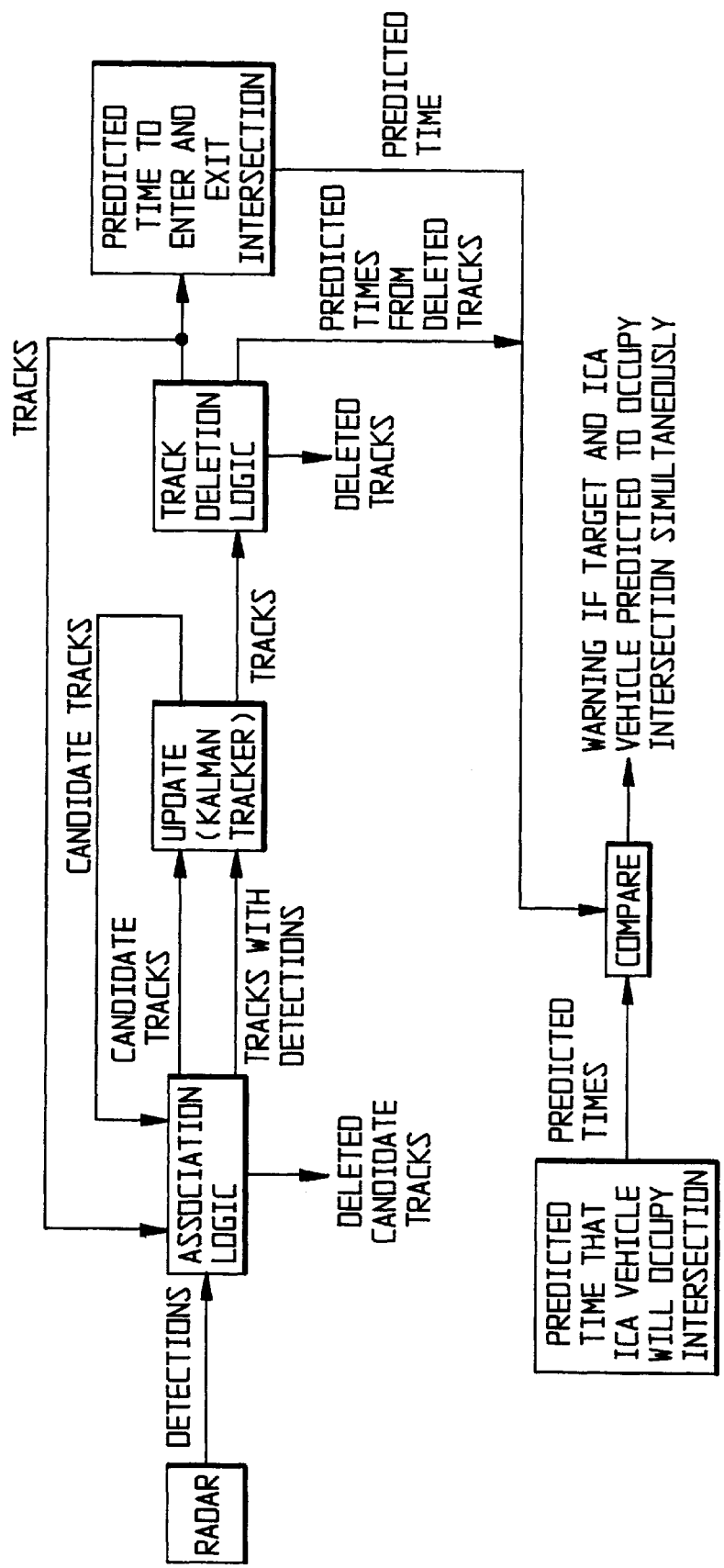
FIG. 21 illustrates the tracking process of the preferred embodiment of the invention of other vehicles that are approaching the same intersection as the subject vehicle.

FIG. 21 illustrates the tracking process by tracker 204 of threat vehicles 102 that are detected by radar system 200. Detection of threat vehicle 102 gives birth to a "candidate" track. Each candidate track can be promoted to a track that is maintained until deleted. Threat vehicles 102 picked up by radar system 200 are used to update the tracks at the end of each processing interval. Using tracking parameters (e.g., position, speed, acceleration, etc.), tracker 204 predicts a new state (e.g., position) of each track or candidate track based on previous updates and places a "gate" around the predicted positions. The preferred gate is a known "maximum likelihood gate" (see, e.g., S. S. Blackman, Multiple Target Tracking with Radar Applications), If a detection does not fall within the gate of an existing candidate track or track, a new candidate track is formed. If a detection does not associate with any candidate track, the candidate track is deleted (typically for a candidate track generated by a non-moving object, such a tree or parked vehicle). If a candidate track does associate with a detection, it is promoted to a track. If a track does not associate with any detection for some specified number of updates, it is maintained or "coasted" on its current trajectory for a specified number of updates after which it is deleted. In the coast mode, the last update of state variables is retained. The track remains ready for an association. If a track is deleted, the predicted times to the intersection can be held resulting in a warning extension for a specified time (typical selections are 0–5 sec). This helps radar system 200 with limited angular coverage to provide warnings when the target is no longer observed. The feature is similar to coasting except that a track does not have to be maintained. A track is deleted if its speed is negative (e.g., the vehicle is moving away from the intersection and is not a threat). A track is also deleted if its speed is unreasonably large (for a car) or its (x, y) position unreasonably large with respect to an intersection and its roadways (e.g., the radar accidentally picks up on a plane).

As noted above, the preferred tracker is a Kalman filter. The state variables selected for the Kalman filter are position (x, y), speed and acceleration. The measurement vector is range, range rate and bearing. A typical "North and East" coordinate system is centered at subject vehicle 100. A plan view would indicate North as x, East as y and bearing as the pointing angle of the antenna. The Kalman filter implemented is an "extended" Kalman filter that accommodates the non-linear measurement matrix relating target state and radar measurements. The inputs to the Kalman filter are processed radar updates, and the output is an updated estimate of the target state vector. From this state vector of position (distance to center of intersection) speed and acceleration, the predicted times to enter and exit the intersection are computed.

Warnings for the countermeasure system are based on the prediction that subject vehicle 100 and threat vehicle 102 will both occupy the intersection at the same time, for which a warning for the driver of subject vehicle 100 is provided by driver vehicle interface 114. Warnings are calculated and updated for every output of the radar, approximately every 100 msec. Driver vehicle interface 114 is activated if there is a warning based on the output of any of the three radar units of radar system 200. The warnings may be distinct based upon the particular radar that detects an oncoming threat vehicle 102 of interest to assist the driver in determining the direction of potential hazard.

The times for subject vehicle 100 to enter and exit the intersection are calculated from the current position and velocity of subject vehicle 100. A nominal velocity and acceleration is assumed for the driver's intentions. If the vehicle is below the nominal velocity, it is assumed to accelerate at the nominal acceleration until it reaches the nominal velocity. Conversely, if the vehicle is above the nominal velocity, the vehicle is assumed to decelerate at the nominal acceleration until it reaches the nominal velocity. This velocity/acceleration profile is easily rationalized for subject vehicle 100 being stopped at an intersection and waiting to enter. The driver would accelerate moderately, but not indefinitely and limit the velocity to a moderate speed. If subject vehicle 100 is going to traverse an intersection without stopping, it is assumed the driver would traverse the intersection at moderate speed, accelerating or decelerating to achieve that speed. However, other assumptions or algorithms as appropriate may be used.

For threat vehicle 102, the position, velocity, and acceleration from tracker 204 are used to calculate the time to and out of the intersection. To determine the times, a simple equation for one-dimensional motion with constant acceleration is solved.

The state of countermeasure system 1000 is determined by the range to the intersection, the type of intersection, and the state of the turn signals of subject vehicle 100. The range to the intersection is updated every 100 msec and calculated based on the current position of subject vehicle 100 and the location of the intersection. The position of subject vehicle 100, the location of the intersection, and the type of intersection that subject vehicle 100 is approaching is determined by the GIS/GPS system 112.

Countermeasure system 1000 is preferably inactive until subject vehicle 100 is within 500 feet of the intersection. At this distance, countermeasure system 1000 becomes active, but the warnings are disabled; this allows time for tracker 240 to initialize, during which any warnings would be invalid since the intersection is still outside the radar range. At 350 feet from the intersection, the warnings are enabled until subject vehicle 100 passes through the intersection.

The type of intersection determines which radars are active and therefore can generate warnings. For example, at a "T" intersection, there is no road in front of the subject vehicle, such that center countermeasure components can be disabled. Similarly, the left and right radar countermeasure components can be disabled at a junction right and left intersection, respectively. All radar countermeasures are operational at a quad (4-way) intersection.

The turn signal indicators on subject vehicle 100 are monitored to determine the intended path of subject vehicle 100 through the intersection. The path through the intersection determines the distance subject vehicle 100 must travel to clear the intersection and therefore determines the time subject vehicle 100 occupies the intersection (e.g., a right turn has the shortest distance and a left turn has the longest distance). The turn signals also have additional effects on the warnings.

Figure 22A:
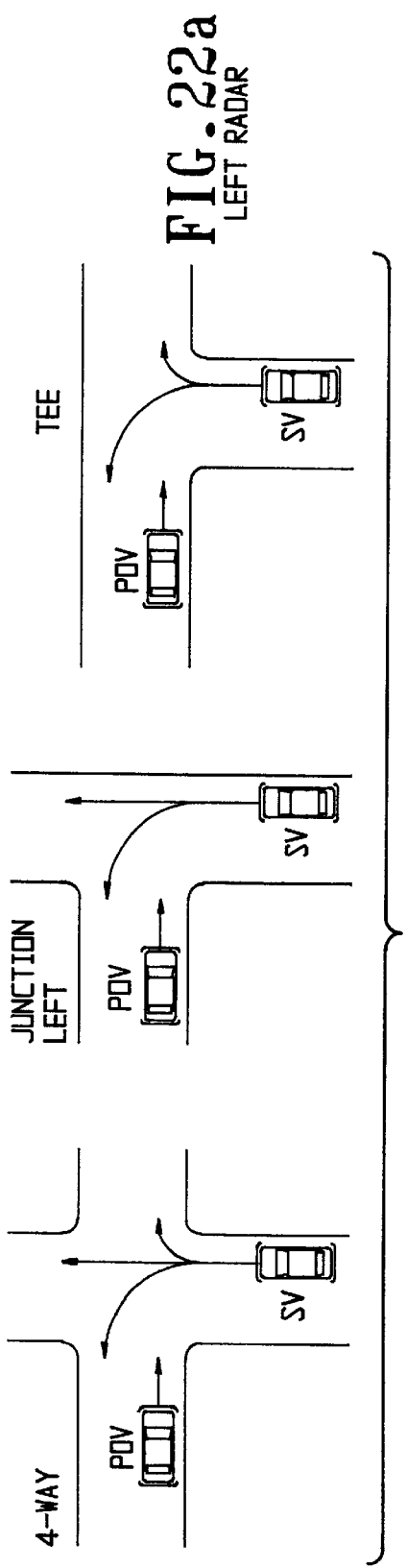
FIGS. 22a, 22b, and 22c illustrate different possible situations for false collision alarms.
Figure 22B:
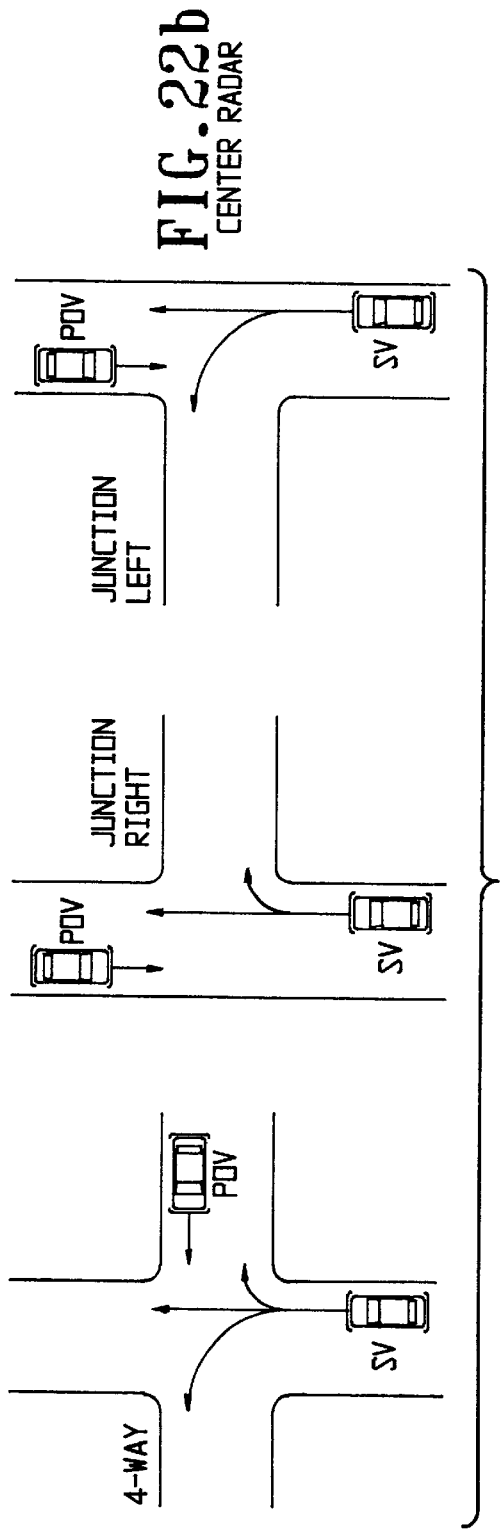
Figure 22C:
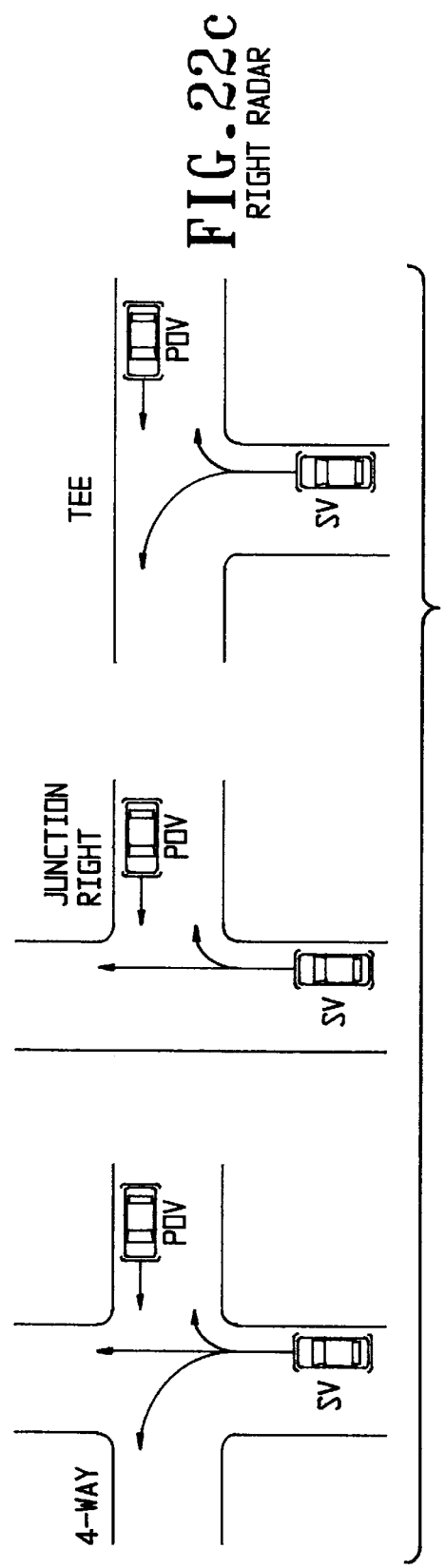

Under certain combinations of intersection type and intended path, threat vehicle 102 may not be a threat even if overlap conditions are otherwise present. This logic is based on subject vehicle 100 turn signals, intersection type, and intended action by threat vehicle 102 as evidenced by the deceleration of threat vehicle 102. FIG. 22 illustrates the different possible situations. By way of non-limiting example:

Left Radar 200 (observes traffic on left cross road)
  4-Way Intersection: subject vehicle 100 makes:
    Left Turn, No Turn, Right Turn:
      No warning if threat vehicle 102 is decelerating more than a prescribed amount, preferably less than 3 ft/s$^2$. This indicates that threat vehicle 102 is slowing to make a right turn, or stopping and is not a threat.
  Junction Left Intersection: subject vehicle 100 makes:
    Left Turn, No Turn:
      No warning if threat vehicle 102 is decelerating, otherwise warning.
  Tee Junction: subject vehicle 100 makes:
    Left Turn, Right Turn:
      No warning if threat vehicle 102 is decelerating.

Center Radar 200 (observe oncoming traffic in adjacent lane(s))
  4-Way Intersection: subject vehicle 100 makes:
    Left Turn:
      No warning if threat vehicle 102 is decelerating. This indicates that threat vehicle 102 will make a left turn and is not a threat. Otherwise, warning.
    Right Turn:
      No warning if threat vehicle 102 is not decelerating. This indicates that threat vehicle 102 will not make a left turn and is not a threat. If threat vehicle 102 is decelerating, a turn is indicated and a warning will occur. If threat vehicle 102 turns left, the warning is correct. If it turns right the target is not a threat and the warning is false. However, the false alarm will not cause a collision.
    No Turn:
      No warning if threat vehicle 102 is not decelerating. This indicates that it will not make a turn and is not a threat.
  Junction Left Intersection: subject vehicle 100 makes:
    Left Turn:
      No warning if threat vehicle 102 is decelerating. This indicates that it will make a right turn or is stopping and is not a threat.
    No Turn:
      Warnings are turned off, as threat vehicle 102 is not a threat.
  Junction Right Intersection: subject vehicle 100 makes:
    No Turn:
      Warning if threat vehicle is decelerating, as it indicates a possible left turn across path.
    Right Turn: No warning.

Right Radar (observes traffic on right crossroad)
  4-Way and Junction Right Intersection. Subject vehicle 100 makes:
    No Turn:
      No warning if threat vehicle 102 is decelerating. This indicates that threat vehicle 102 will likely make a right turn and is not a threat.
    Right Turn:
      Warnings are turned off, as there are no likely threats from right roadway when subject vehicle 100 is making right turn or stopping.
  Tee Intersection. Subject vehicle 100 makes
    Right Turn:
      Warnings are turned off, as there are no likely threats from right roadway when subject vehicle 100 makes a right turn.
    Left Turn:
      No warning if threat vehicle 102 is decelerating.

To the extent that the above algorithm relies on deceleration, a minimum deceleration threshold may also be used (this may be zero).

Additional false alarms may be generated based upon the relative positions of subject vehicle 100 and threat vehicle 102. By way of non-limiting example, a warning would issue if subject vehicle 100 is just leaving the intersection while threat vehicle 102 is just entering the intersection. To avoid such false alarms, the area of overlap used can be smaller than the entire intersection. In the alternative, overlap can be tested for different areas; e.g., overlap is checked for the entire intersection, then again for 90 percent of the intersection. Other exclusionary algorithms may also be used.

Figure 23:
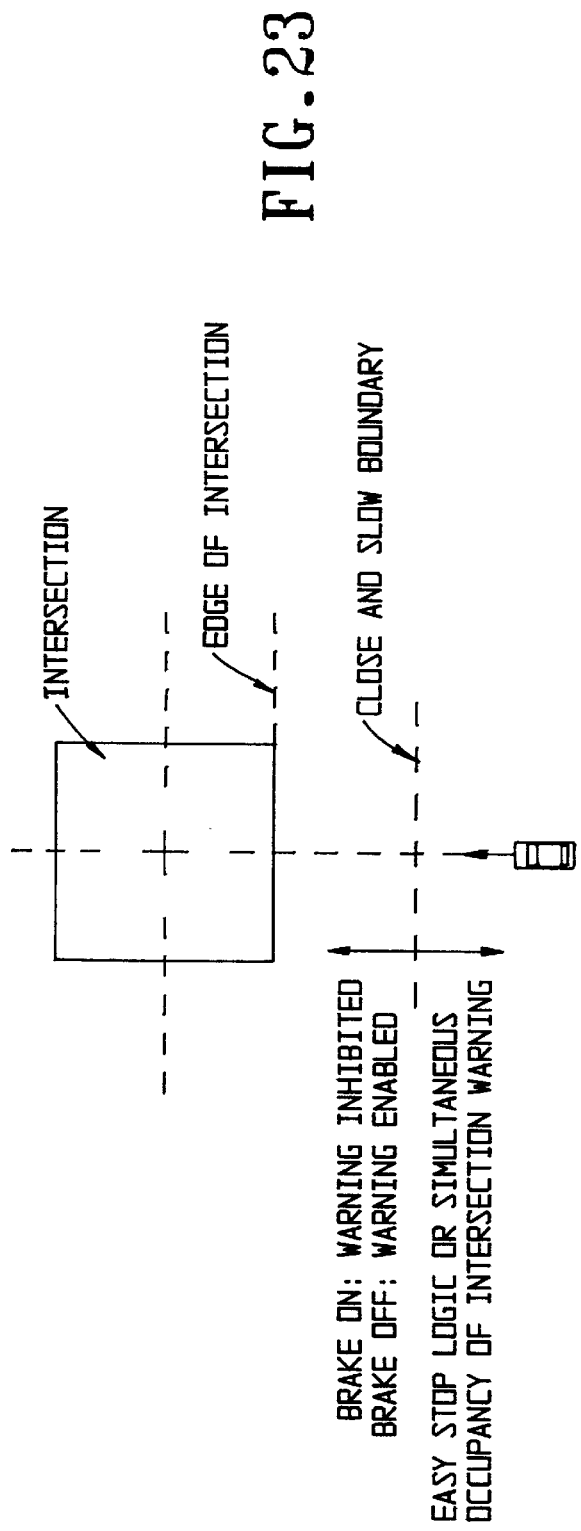
FIG. 23 illustrates boundaries about an intersection for enabling/disabling warnings.

False alarms may also be avoided based on slow speed of subject vehicle 100 in combination with the application of the brakes. Referring now to FIG. 23, the system recognizes a "close and slow" boundary during which time subject vehicle 100 is moving toward the intersection, albeit slowly under braking control. Even this slow movement of subject vehicle will result in predicted overlap with opposing traffic. The warning can therefore be disabled if subject vehicle is within a certain distance of the intersection (e.g., 50 feet), moving slowly (e.g., 5 feet/sec) and the driver is applying the brakes.

The GIS/GPS system 112 of the present invention has multiple functions. For example, the system can determine subject vehicle 100 is reacting to the intersection that they are approaching, and provide warnings of potential violation of the traffic control. The GIS map database 206 provides data on each intersection, such as type of intersection and traffic control at the intersection. This information is provided to the threat detection system 110, and allows the system to align the scanning range of each radar of radar system 200 to accommodate non-orthogonal intersections. In operation, the vehicle's position, derived from the GPS, is used to search the map database 206 and locate the roadway on which subject vehicle 100 is currently traveling. The database 206 is then used to determine the next intersection subject vehicle 100 is approaching. The properties of the intersection are utilized to determine the potential for driver violation of the intersection (if under traffic control), and by the threat detection system 110 to align radar system 200. The position of subject vehicle 100 is updated every 100 msec. Intersection data is updated when a new intersection is identified.

A KVH Continuous Positioning System (CPS) may also be used to provide vehicle latitude, longitude, heading, and speed using GPS and dead reckoning. The CPS utilizes a Kalman-filtering scheme to blend data from GPS, a fiber optic gyroscope, and the vehicle speed sensor to yield continuous position information regardless of GPS dropout or multipath. Dead reckoning improves the GPS accuracy and availability by providing precise location, velocity, direction and heading data even at slow speeds or when stationary. A Differential GPS (DGPS) Beacon Receiver can also be added to further enhance positional accuracy.

Figure 24:
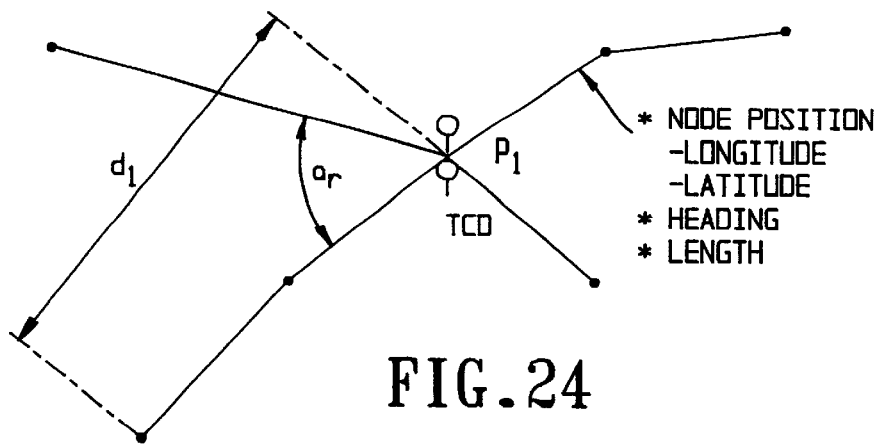
FIG. 24 illustrates the manner in which the map database 206 represents an intersection.

The GIS map database 206 decomposes roadways down to individual segments that include nodes and line segments. These nodes and segments are assigned various properties or attributes. Typical properties of these segments are position, length, ID number, and adjoining roadway segments. FIG. 24 illustrates the manner in which the map database 206 represents an intersection. This allows intersections to be readily differentiated from other roadways. With the vehicle located on a specific roadway segment, vehicle-heading data is used to determine the node it is approaching. An association algorithm within the software determines if the node is an intersection. The database is searched using a library of software function calls that provide an efficient way to locate the closest roadway to a given latitude and longitude. Addition algorithms can be used to track along a roadway to eliminate errors. For example, when the vehicle passes through an intersection, the closest roadway to the GPS position may be the intersecting roadway and not the current vehicle roadway. In this case, the software looks for a change in heading indicating a turn before it switches the track to the intersecting roadway.

A laptop computer mounted within subject vehicle 100 is connected to CPU 116 by an RS-232 cable. Messages are sent between the two computers to exchange data. The data elements for the messages to the GIS/GPS system 112 preferably include: time tag; GPS time; subject vehicle 100 latitude, longitude, speed, and true heading. This data is received every 100 msec. Preferably, the CPS is attached to CPU 116 by an RS-232 cable instead of directly to the GIS/GPS system 112 to avoid time delay.

When a message is received, the data is used to query the map database to identify the intersection the vehicle is approaching. If the vehicle has passed through an intersection and a new intersection has been identified, a message is sent to the CPU 116 providing the threat detection software with the characteristics of the new intersection. CPU 116 periodically sends a message to the GIS/GPS system 112 requesting the current approaching intersection. This ensures that the threat detection system 110 always has the correct intersection information. The GIS/GPS system 112 also provides a user interface to CPU 116, since this system preferably does not have a display or keyboard for user inputs. This interface is used during testing to control data acquisition for post-test processing, changing of tracker or warning algorithm parameters, and the display of error messages.

The system uses vehicle speed to calculate subject vehicle 100 time to the intersection and with the radar range rate in the calculation of threat vehicle 102 speed in the tracker software. The CPS measures the speed of subject vehicle 100 using the speed sensor of the vehicle, although various methods for speed measurement may be used. To account for any delay in detecting the measurement, a lead filter may be used to minimize or offset any error due to this delay.

A multi-modal driver vehicle interface is recommended to provide driver warnings: (1) visually, through a HUD display, (2) aurally, using a pulsed tone, and/or (3) by pulsing the brakes. No single modality meets all the design criteria. For example, visual warnings via a HUD enables the presentation of more detailed information, but requires drivers' attention to be focused on the forward view to perceive the warning. Auditory warnings, while widely used and not orientation specific, exclude hearing-impaired drivers and can be masked by ambient noise (although left, right and center speaker distribution could be used to give a driver a perception of the direction of the potential hazard. Braking warnings, while meeting most of the criteria, cannot provide detailed information.

The brake system utilizes after-market calipers designed for use in auto racing. These calipers are mounted at all four wheels. The braking system can be tailored to provide deceleration to the vehicle without the driver providing input. The system utilizes computer control to open and close solenoid valves. These valves control the flow of hydraulic fluid to the secondary brake calipers. Level and configuration of the deceleration are controlled by countermeasure system 1000. The system is capable of providing a constant deceleration or a pulsed deceleration of varying magnitude and duration. The system is designed with a fail-safe mode of SYSTEM OFF. That is, the system fails with the secondary brakes in a non-functional mode.

It is noted that a system for preventing a vehicle from entering an intersection in violation of a traffic control device is disclosed in pending U.S. patent application Ser. No. 09/433,717, filed Nov. 4, 1999, the disclosure of which is expressly incorporated by reference herein in its entirety. It is further noted that the elements disclosed herein for avoiding collisions in intersections may be used without elements directed toward compliance with traffic control devices.

Various departures from or modifications to the preferred embodiment above fall within the scope and spirit of the present invention.

Various known components may be used in the present invention. By way of non-limiting example, the radar antenna controller is preferably the ACR2000, Part No. PM08117, Version 1.04, manufactured by: ACROLOOP MOTION CONTROL SYSTEMS, INC.; the GPS receiver is preferably the KVH Continuos Positioning System; the differential GPS receiver is preferably the COMMUNICATIONS SYSTEMS INTERNATIONAL DGPS Beacon Receiver, Model ABX-3; and the GPS/DGPS antenna is preferably the COMMUNICATIONS SYSTEMS INTERNATIONAL GPS/DGPS Antenna, Model MBL-3.

By way of non-limiting example, although three radar units are preferred, any number of units, including a single unit, can be used. Other types of detectors, such as lasers, could also be used. The position of the unit(s) (to the extent relevant) is only limited to areas where they can effectively detect movement of oncoming traffic. If detection were based on methods other than line of sight (e.g., each vehicle transmitted its GPS coordinates to other local vehicles), then the detector could be mounted anywhere in the subject vehicle, or at some remote location that would send warning data to the subject vehicle.

Similarly, various components or operations of countermeasure system 1000 can be moved within or between the various subsystems without affecting the scope and spirit of the invention.

The preferred embodiment preferably updates the scan angle of the left and right radar units at the end of each scan. However, the invention is not so limited, as the scan angle can be updated mid-scan.

The various positions of the control points and other technical features of the preferred embodiments herein, are particular to countries such as the United States in which vehicles stay to the right. It falls well within the scope and spirit of the present invention to similarly address driving in countries in which vehicles travel on the left side of the road, such modifications being well within the scope of the art based on the teachings herein.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for a subject vehicle to avoid collisions, comprising:

separately scanning, in proximity to an intersection, at least two sectors of an area around the intersection;

detecting the presence of a threat vehicle in at least one lane;

predicting whether the subject vehicle and the threat vehicle will occupy the intersection at the same time; and issuing a warning in response to said predicting.

2. The method of claim 1, said detecting further comprising:

identifying an object picked up by said scanning;

disregarding the object as a threat vehicle if it one of stationary and moving away from the intersection.

3. The method of claim 1, further comprising disabling said issuing when prevailing conditions indicate a low probability of a collision in the intersection, the prevailing conditions including at least one of a direction of travel of the subject vehicle, a direction of travel of the threat vehicle, activation of a particular turn signal in the subject vehicle, velocity of the target vehicle, velocity of the target vehicle, and acceleration of the target vehicle.

4. The method of claim 3, said disabling being responsive to the threat vehicle approaching the intersection from the left of the subject vehicle, and the threat vehicle is decelerating more than a predetermined amount.

5. The method of claim 3, said disabling being responsive to:

the threat vehicle is approaching the intersection from in front of the subject vehicle, and one of:

the subject vehicle has activated its left turn signal and the threat vehicle is decelerating more than a predetermined amount;

the subject vehicle has activated its right turn signal and the threat vehicle is not decelerating by more than a predetermined amount;

the subject vehicle has not activated a turn signal and the threat vehicle is not decelerating by more than a predetermined amount; and the subject vehicle has activated its right turn signal and there is no left lane extending from the intersection.

6. The method of claim 3, said disabling being responsive to:

the threat vehicle is approaching the intersection from the right of the subject vehicle, and one of:

the subject vehicle has activated its left turn signal and the threat vehicle is decelerating more than a predetermined amount;

the subject vehicle has activated its right turn signal; and the subject vehicle has not activated a turn signal and the threat vehicle is decelerating by more than a predetermined amount.

7. A method for a subject vehicle to avoid collisions, comprising:

separately scanning left, right, and forward sectors of the subject vehicle, said scanning being responsive to the subject vehicle coming within a predetermined distance of an intersection;

detecting the presence of a threat vehicle in at least one lane feeding the intersection;

predicting whether said subject vehicle and said threat vehicle will occupy the intersection at the same time;

issuing a warning in response to said predicting.

8. The method of claim 7, further comprising:

storing a map database;

receiving coordinate data representing a position of the subject vehicle;

said separate scanning being in response to a position of the subject vehicle, from the coordinate data, being within a predetermined distance from an intersection in the map database.

9. The method of claim 7, further comprising:

storing a map database, the map including the intersection;

disabling said left, right and center and center scanning in response to the map database indicating an absence of any lanes entering said intersection in said left, right and center sectors, respectively.

10. The method of claim 7, said radar separately scanning the left and right sectors, each further comprising:

oscillating a radar antenna by a predetermined angle relative to a control point; and moving the control point away from the intersection as the subject vehicle approaches the intersection.

11. A method of controlling a radar antenna mounted on a moving vehicle, comprising:

oscillating the radar antenna about a predetermined angle relative to a control point, the control point representing a position in a lane feeding into an intersection; and moving the control point away from the intersection as the subject vehicle approaches the intersection.

12. The method of claim 11, wherein said oscillating commences in response to the subject vehicle coming within a predetermined distance of the intersection.

13. The method of claim 12, wherein said moving comprises maintaining the control point a substantially consistent distance away from the subject vehicle.

14. The method of claim 11, further comprising:

detecting, in response to radar signals from the radar antenna, the presence of a threat vehicle in at least one lane feeding the intersection;

predicting whether the subject vehicle and the threat vehicle will occupy the intersection at the same time;

issuing a warning in response to said predicting.

15. The method of claim 11, further comprising disabling said issuing when prevailing conditions indicate a low probability of a collision in the intersection, the prevailing conditions including at least one of a direction of travel of the subject vehicle, a direction of travel of the threat vehicle, activation of a particular turn signal in the subject vehicle, and acceleration of the target vehicle.

16. A method for preventing a subject vehicle from accidents in intersections, comprising:

storing a map in a database, the map including at least one intersection with a traffic control device;

receiving coordinate data reflecting a position of the subject vehicle;

determining whether the subject vehicle will enter an intersection of the at least one intersection in violation of an associated traffic control device;

issuing a warning to a driver of the subject vehicle in response to a determination that the subject vehicle will enter an intersection of the at least one intersection in violation of an associated traffic control device;

separately scanning at least two sectors of an area around the intersection;

identifying any threat vehicles in the area;

predicting whether the subject vehicle and the threat vehicle will occupy the intersection at the same time;

issuing a warning to a driver of the subject vehicle in response to a prediction that the subject vehicle and the threat vehicle will occupy the intersection at the same time;

determining whether prevailing conditions indicate a low probability of a collision in the intersection; and disabling said issuing a warning to a driver of the subject vehicle in response to a prediction when the prevailing conditions indicate a low probability of a collision in the intersection.

17. A collision prevention device mounted on a subject vehicle, comprising:

left, right and center radar antennas;

a controller programmed to oscillate said left and right radar antennas about a predetermined angle relative to left and right control points respectively, the control points representing positions in left and right lanes feeding into an intersection; and said controller being programmed to move said left and right control points away from the intersection as the subject vehicle approaches the intersection.

18. The collision prevention device of claim 17, further comprising:

a map database including an intersection;

said controller being programmed to disable operation of said left, right, and center radar antennas in response to said map database indicating an absence of lanes leading into said intersection in the areas covered by the left, right and center radar antennas, respectively.

19. The collision prevention device of claim 17, further comprising:

a map database including an intersection;

a tracker capable of distinguishing a threat vehicle from other objects detected by said left, right, and center radar antennas;

at least one of said trackers and said controllers being capable of determining whether said subject vehicle and said threat vehicle will occupy the intersection at the same time;

said controller being programmed to issue a warning signal in response to whether said subject vehicle and said threat vehicle will occupy the intersection at the same time and when the prevailing conditions do not indicate a low probability of a collision in the intersection.

20. The collision prevention device of claim 19, wherein said tracker is capable of excluding as threat vehicles any objects detected by said left, right, and center radar antennas that are stationary and moving away from the intersection.

21. A collision prevention device, comprising:

left, right and center radar antennas;

a map database, a map in the database including an intersection;

a tracker capable of distinguishing a threat vehicle approaching the intersection from other objects detected by said left, right, and center radar antennas;

a controller being capable of determining whether said subject vehicle and said threat vehicle will occupy an intersection at the same time; and said controller being programmed to issue a warning signal in response to whether said subject vehicle and said threat vehicle will occupy an intersection at the same time and when the prevailing conditions do not indicate a low probability of a collision in the intersection.

22. The device of claim 21, wherein a prevailing condition that indicates a low probability of collision includes the threat vehicle approaching an intersection from the left of the subject vehicle, and the threat vehicle is decelerating more than a predetermined amount.

23. The device of claim 21, wherein a prevailing condition that indicates a low probability of collision includes the threat vehicle approaching an intersection from in front of the subject vehicle, and one of:

the subject vehicle has activated its left turn signal and the threat vehicle is decelerating more than a predetermined amount;

the subject vehicle has activated its right turn signal and the threat vehicle is not decelerating by more than a predetermined amount;

the subject vehicle has not activated a turn signal and the threat vehicle is not decelerating by more than a predetermined amount; and the subject vehicle has activated its right turn signal and there is no left lane extending from the intersection.

24. The device of claim 21, wherein a prevailing condition that indicates a low probability of collision includes the threat vehicle approaching the intersection from the right of the subject vehicle, and one of:

the subject vehicle has activated its left turn signal and the threat vehicle is decelerating more than a predetermined amount;

the subject vehicle has activated its right turn signal; and the subject vehicle has not activated a turn signal and the threat vehicle is decelerating by more than a predetermined amount.

* * * * *